(12) United States Patent
Brasch et al.

(10) Patent No.: US 11,007,399 B1
(45) Date of Patent: *May 18, 2021

(54) RETRACTABLE WALL MOUNTED WEIGHTLIFTING BENCH SYSTEM

(71) Applicant: PRX Performance, LLC, Fargo, ND (US)

(72) Inventors: Brian B. Brasch, Detroit Lakes, MN (US); Steven R. Wagner, Fargo, ND (US)

(73) Assignee: PRx Performance, LLC, Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/172,456

(22) Filed: Feb. 10, 2021

Related U.S. Application Data

(63) Continuation of application No. 17/097,911, filed on Nov. 13, 2020, which is a continuation of application
(Continued)

(51) Int. Cl.
*A63B 21/16* (2006.01)
*A63B 21/00* (2006.01)
(Continued)

(52) U.S. Cl.
CPC ........ *A63B 21/4029* (2015.10); *A63B 21/078* (2013.01); *A63B 21/169* (2015.10);
(Continued)

(58) Field of Classification Search
CPC . A63B 21/078; A63B 21/169; A63B 21/4029; A63B 2210/50; A63B 2210/56; A63B 2225/093; F16B 7/10; F16B 7/105
See application file for complete search history.

(56) References Cited

U.S. PATENT DOCUMENTS 1,104,505 A 7/1914 Holworthy
1,696,145 A 12/1928 Wagoner
(Continued)

FOREIGN PATENT DOCUMENTS

| CN | 103598759 A | 2/2014 |
|---|---|---|
| DE | 4307632 A1 | 9/1993 |
| GB | 2076299 A | 12/1981 |

OTHER PUBLICATIONS

2717 Equipment Facebook Posts—W-1 Pull Up and Rack; Nov. 8, 2012.
(Continued)

*Primary Examiner* — Joshua Lee
(74) *Attorney, Agent, or Firm* — Neustel Law Offices

(57) ABSTRACT

A retractable wall mounted weightlifting bench system for that is extended outwardly from the wall when in use and retracted towards the wall when not in use. The retractable wall mounted weightlifting bench system generally includes a mounting bracket adapted to be attached to a wall, a bench pivotally connected to the mounting bracket that has an extended position and a retracted position, a first support member pivotally attached to the bench and a second support member pivotally attached to the bench. The first surface of the bench is horizontal or inclined when in the extended position to be used as a weightlifting bench. The first surface of the bench is in a substantially vertical position when in the retracted position for compact storage of the bench near the wall.

30 Claims, 19 Drawing Sheets

Related U.S. Application Data

No. 16/266,393, filed on Feb. 4, 2019, now Pat. No. 10,835,774, which is a continuation of application No. 15/437,176, filed on Feb. 20, 2017, now Pat. No. 10,195,479.

(60) Provisional application No. 62/297,515, filed on Feb. 19, 2016.

(51) Int. Cl.
*F16B 7/10* (2006.01)
*A63B 21/078* (2006.01)

(52) U.S. Cl.
CPC ............ *F16B 7/10* (2013.01); *A63B 2210/50* (2013.01); *A63B 2210/56* (2013.01); *A63B 2225/093* (2013.01); *F16B 7/105* (2013.01)

(56) References Cited

U.S. PATENT DOCUMENTS

| | | |
|---|---|---|
| 2,855,200 A | 10/1958 | Blickman |
| 3,614,097 A | 10/1971 | Blickman |
| 3,874,657 A | 4/1975 | Niebojewski |
| 3,918,710 A | 11/1975 | Niebojewski |
| 4,249,726 A | 2/1981 | Faust |
| 4,257,590 A | 3/1981 | Sullivan |
| 4,262,901 A | 4/1981 | Faust |
| 4,275,882 A * | 6/1981 | Grosser ............ A63B 21/00072 482/112 |
| 4,286,782 A | 9/1981 | Fuhrhop |
| 4,306,715 A | 12/1981 | Sutherland |
| 4,358,109 A | 11/1982 | Schrems |
| 4,368,884 A | 1/1983 | Colvin |
| 4,369,966 A | 1/1983 | Silberman |
| 4,396,191 A | 8/1983 | Metler |
| 4,527,797 A | 7/1985 | Slade, Jr. |
| 4,603,855 A | 8/1986 | Sebelle |
| 4,615,524 A | 10/1986 | Sutherland |
| 4,621,809 A | 11/1986 | Pearl |
| 4,635,934 A | 1/1987 | Roethke |
| 4,637,608 A | 1/1987 | Owens |
| 4,645,196 A | 2/1987 | Christie |
| 4,650,186 A | 3/1987 | McCreery |
| 4,729,561 A | 3/1988 | Desjardins |
| 4,757,998 A | 7/1988 | Landin |
| 4,765,616 A | 8/1988 | Wolff |
| 4,773,642 A | 9/1988 | Cruz |
| 4,781,374 A | 11/1988 | Lederman |
| 4,795,149 A | 1/1989 | Pearson |
| 4,804,179 A | 2/1989 | Murphy |
| 4,826,153 A | 5/1989 | Schalip |
| 4,842,270 A | 6/1989 | Lange |
| 4,844,448 A | 7/1989 | Niznik |
| 4,861,024 A | 8/1989 | Lee |
| 4,861,025 A | 8/1989 | Rockwell |
| 4,898,381 A | 2/1990 | Gordon |
| 4,907,798 A | 3/1990 | Burchatz |
| 4,915,377 A | 4/1990 | Malnke |
| 4,919,419 A | 4/1990 | Houston |
| 4,927,135 A | 5/1990 | Nieppola |
| 4,928,961 A | 5/1990 | Madden |
| 4,934,693 A | 6/1990 | Santoro |
| 4,936,572 A | 6/1990 | Desiderio |
| 4,955,604 A | 9/1990 | Pogue |
| 4,958,833 A | 9/1990 | Stater |
| 4,960,277 A | 10/1990 | LaRossa |
| 4,974,837 A | 12/1990 | Someya |
| 4,976,428 A | 12/1990 | Ghazi |
| 5,011,141 A | 4/1991 | Towley, III |
| 5,046,722 A | 9/1991 | Antoon |
| 5,082,259 A | 1/1992 | Gonzalez |
| 5,082,260 A | 1/1992 | Dinelli |
| 5,098,361 A | 3/1992 | Danylieko |
| 5,141,480 A | 8/1992 | Lennox |
| 5,151,072 A | 9/1992 | Cone |
| 5,184,992 A | 2/1993 | Banks |
| 5,242,345 A | 9/1993 | Mitchell |
| 5,249,858 A | 10/1993 | Nusser |
| 5,281,193 A | 1/1994 | Colbo, Jr. |
| 5,306,220 A | 4/1994 | Kearney |
| 5,328,428 A | 7/1994 | Huang |
| 5,346,448 A | 9/1994 | Sollo |
| 5,350,346 A | 9/1994 | Martinez |
| 5,456,644 A | 10/1995 | Hecox |
| 5,466,204 A | 11/1995 | Nearing |
| 5,509,876 A | 4/1996 | Reyes |
| 5,551,936 A | 9/1996 | Parisi |
| 5,669,859 A | 9/1997 | Liggett |
| 5,688,216 A | 11/1997 | Mauriello |
| D390,287 S | 2/1998 | Hsieh |
| 5,755,823 A | 5/1998 | Cleary |
| 5,779,601 A | 7/1998 | Ish, III |
| 5,813,951 A | 9/1998 | Einsig |
| 5,882,283 A | 3/1999 | Stevens |
| 5,921,897 A | 7/1999 | Stevens |
| 5,971,897 A | 10/1999 | Olson |
| 6,027,433 A | 2/2000 | Flynn |
| 6,073,624 A | 6/2000 | Laurent |
| 6,248,048 B1 | 6/2001 | Zuckerman |
| 6,299,568 B1 | 10/2001 | Prok |
| 6,328,679 B1 | 12/2001 | Croft |
| 6,443,877 B1 | 9/2002 | Hoecht |
| 6,579,213 B1 | 6/2003 | Webber |
| 6,685,601 B1 | 2/2004 | Knapp |
| 7,070,546 B1 | 7/2006 | Grasso |
| 7,338,416 B2 | 3/2008 | Smith |
| 7,374,516 B2 | 5/2008 | Lundquist |
| 7,393,309 B2 | 7/2008 | Webber |
| 7,455,621 B1 | 11/2008 | Anthony |
| 7,488,277 B1 | 2/2009 | Knapp |
| 7,549,950 B1 | 6/2009 | Lundquist |
| 7,635,322 B2 | 12/2009 | Parrilla |
| 7,666,118 B1 | 2/2010 | Anthony |
| 7,699,756 B2 | 4/2010 | Piane, Jr. |
| 8,047,972 B1 | 11/2011 | Dean |
| 8,231,509 B2 | 7/2012 | Lundquist |
| 8,491,449 B2 | 7/2013 | Rogers |
| 8,547,900 B2 | 10/2013 | Yi |
| 8,727,953 B2 | 5/2014 | Drechsler |
| 9,333,387 B2 | 5/2016 | Hopperstad |
| 9,409,048 B1 | 8/2016 | Hopperstad |
| 9,498,670 B1 | 11/2016 | Hopperstad |
| 9,675,510 B2 | 6/2017 | Moerth-Cross |
| 2004/0092369 A1 | 5/2004 | Slawinski |
| 2008/0276551 A1 | 11/2008 | Thomas |
| 2009/0143203 A1 | 6/2009 | Knapp |
| 2009/0289535 A1 | 11/2009 | Weber |
| 2010/0048368 A1* | 2/2010 | Donofrio ............ A63B 21/0552 482/130 |
| 2011/0195822 A1* | 8/2011 | Donofrio ............ A63B 21/169 482/93 |
| 2012/0289384 A1 | 11/2012 | Staten |
| 2013/0257242 A1 | 10/2013 | Bunch |
| 2014/0018215 A1* | 1/2014 | Donofrio ......... A63B 23/03558 482/129 |
| 2014/0031182 A1* | 1/2014 | Donofrio ............ A63B 21/169 482/129 |
| 2014/0243174 A1 | 8/2014 | Alenaddaf |
| 2014/0339184 A1 | 11/2014 | Couch |
| 2015/0148197 A1 | 5/2015 | Lentz |
| 2015/0352395 A1* | 12/2015 | Gregory ........... A63B 23/03558 482/123 |
| 2016/0016033 A1 | 1/2016 | Schrag |
| 2017/0197109 A1 | 7/2017 | Cole |
| 2019/0240525 A1 | 8/2019 | Leipheimer |

OTHER PUBLICATIONS

2717 Equipment Facebook Posts—Wall Mounted Pull Up and Squat Rack; Mar. 27, 2012.
https://www.youtube.com/watch?v=koAzH9lo474; YouTube Video Matt Chan Talks the Dirty South Bar; Dec. 20, 2012.

(56) References Cited

OTHER PUBLICATIONS htttps://www.youtube.com/watch?v=f6bPYbS_2Fw; YouTube Video Equipment Demo Rogue Dirty South Bar; Apr. 25, 2012.
Pictures of PRX Performance Pull-Up Bar on Central Rig Display at Granite Games; Oct. 5, 2013.
http://board.crossfit.com/showthread.php?t=86058; Pictures from Website for Crossfit Message Board; Feb. 8, 2014.
http://board.crossfit.com/showthread.php ?t=86058; Website for Cross fit Message Board; Feb. 8, 2014.
http://www.roguefitness.com/rogue-4-monster-lite-wall-mount, Webpage from Rogue Fitness; Jan. 1, 2014.
http://www.roguefitness.com:80/x-43m-multi-grip-crossmember.php; Rogue Fitness X-43 Multi-Grip Crossmember Website Page; Jan. 23, 2013.
http://www.roguefitness.com:80/w4-garage-gym.php; Rogue Fitness W-4 Garage Gym Website Page; Jan. 23, 2013.
http://www.roguefitness.com:80/rogue-sm-2-monster-squat-stand.php; Rogue Fitness SM-2 Monster Squat Stand Website Page; Jan. 27, 2013.
http://www.roguefitness.com: 80/rogue-r-3-power-rack.php; Rogue Fitness R3 Power Rack Website Page; Jan. 11, 2013.
http://www.roguefitness.com:80/bodyweight-gymnastics/rpg-pullup-system.php; Rogue Fitness Pull Up & RPG Systems Website Page; Jan. 23, 2013.
http://www.roguefitness.com:80/dirty-south-bar.php; Rogue Fitness Dirty South Bar Website Page; Jan. 23, 2013.

\* cited by examiner

RETRACTABLE WALL MOUNTED WEIGHTLIFTING BENCH SYSTEM

CROSS REFERENCE TO RELATED APPLICATIONS

The present application is a continuation of U.S. application Ser. No. 17/097,911 filed on Nov. 13, 2020, which is a continuation of U.S. application Ser. No. 16/266,393 filed on Feb. 4, 2019 now issued as U.S. Pat. No. 10,835,774, which is a continuation of U.S. application Ser. No. 15/437,176 filed on Feb. 20, 2017 now issued as U.S. Pat. No. 10,195,479, which claims priority to U.S. Provisional Application No. 62/297,515 filed Feb. 19, 2016. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a retractable wall mounted weightlifting bench that is extended outwardly from the wall when in use and retracted towards the wall when not in use.

Related Art

Any discussion of the related art throughout the specification should in no way be considered as an admission that such related art is widely known or forms part of common general knowledge in the field.

Conventional weightlifting benches are typically comprised of a horizontally orientated (or inclined) bench, a front pair of legs extending downwardly from a front portion of the bench and arear pair of legs extending downwardly from a rear portion of the bench. Some conventional weightlifting benches have an adjustable incline to move between a horizontal state to an inclined state for performing various types of weightlifting exercises.

One problem with conventional weightlifting benches is they are relatively large and require a significant amount of storage space when not in use. This is a particularly troublesome problem for smaller gyms where space is a premium such as, but not limited to, home gyms. In addition, most weightlifting benches are constructed of heavy metal materials making them difficult and cumbersome to move around a gym.

SUMMARY

An example embodiment is directed to a retractable wall mounted weightlifting bench system. The retractable wall mounted weightlifting bench system includes a mounting bracket adapted to be attached to a wall, a bench pivotally connected to the mounting bracket that has an extended position and a retracted position, a first support member pivotally attached to the bench and a second support member pivotally attached to the bench. The first surface of the bench is horizontal or inclined when in the extended position to be used as a weightlifting bench. The first surface of the bench is in a substantially vertical position when in the retracted position for compact storage of the bench near the wall.

There has thus been outlined, rather broadly, some of the embodiments of the retractable wall mounted weightlifting bench system in order that the detailed description thereof may be better understood, and in order that the present contribution to the art may be better appreciated. There are additional embodiments of the retractable wall mounted weightlifting bench system that will be described hereinafter and that will form the subject matter of the claims appended hereto. In this respect, before explaining at least one embodiment of the retractable wall mounted weightlifting bench system in detail, it is to be understood that the retractable wall mounted weightlifting bench system is not limited in its application to the details of construction or to the arrangements of the components set forth in the following description or illustrated in the drawings. The retractable wall mounted weightlifting bench system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1A:
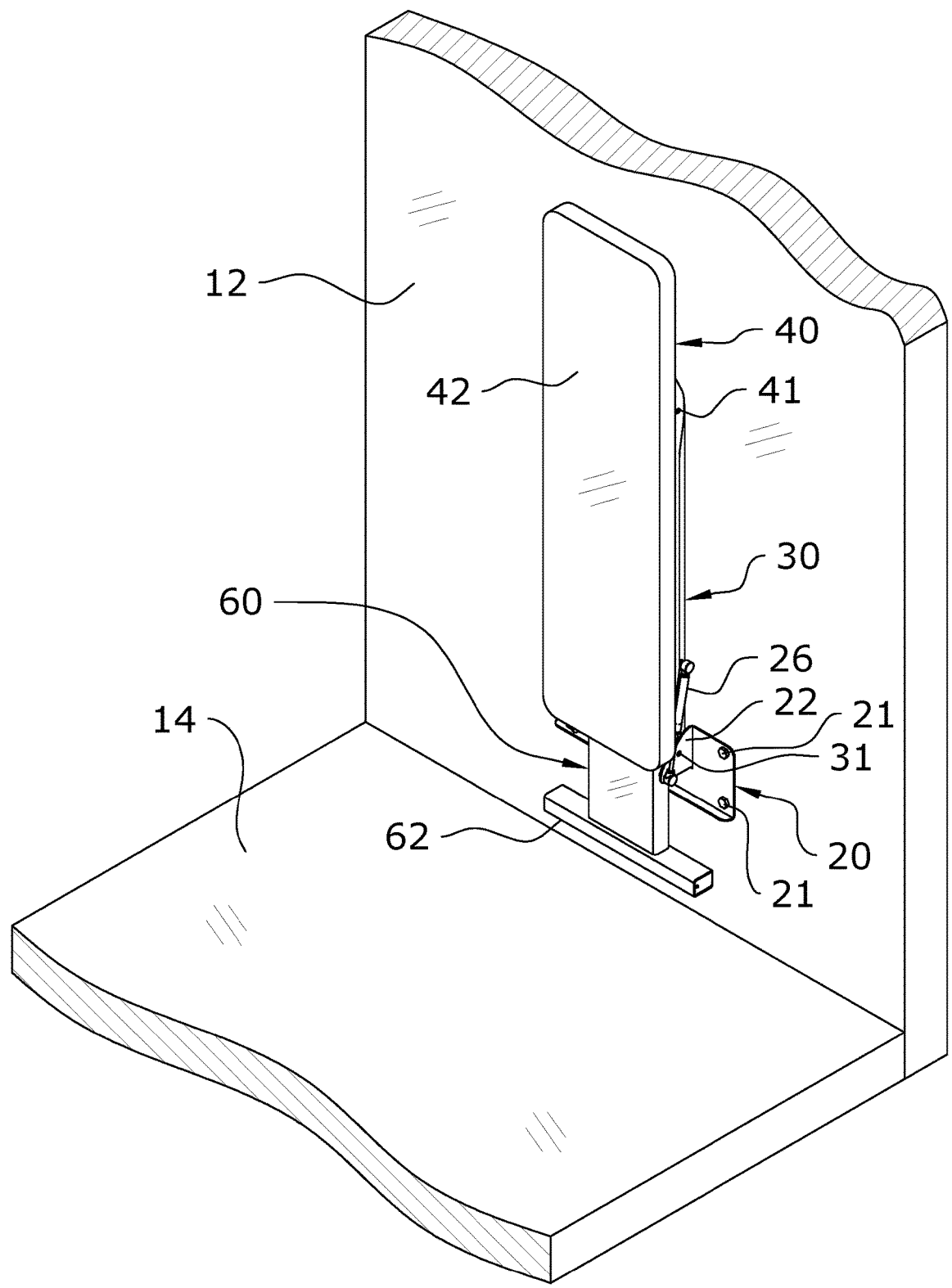
FIG. 1a is a perspective view of a retractable wall mounted weightlifting bench attached to a wall in a retracted state in accordance with an example embodiment.

A. Overview.

An example retractable wall mounted weightlifting bench system generally comprises a mounting bracket 20 adapted to be attached to a wall 12, a bench 42 pivotally connected to the mounting bracket 20 that has an extended position and a retracted position, a first support member 50 pivotally attached to the bench 42 and a second support member 60 pivotally attached to the bench 42. The first surface of the bench 42 is horizontal or inclined when in the extended position to be used as a weightlifting bench 42. The first surface of the bench 42 is in a substantially vertical position when in the retracted position for compact storage of the bench 42 near the wall 12.

B. Mounting Bracket.

FIGS. 1 through 9 illustrate an exemplary mounting bracket 20 adapted to be attached to a wall 12 with fasteners 21 (e.g. bolts, screws). Apertures within the mounting bracket 20 receive the fasteners 21 as shown in FIG. 4b of the drawings. The mounting bracket 20 has a flat portion that is positioned against the wall 12 wherein the apertures extend through the flat portion of the mounting bracket 20 for receiving the fasteners 21 as shown in FIG. 4b of the drawings. The apertures are preferably aligned with studs in the wall 12, but various other configurations may be used for the apertures. The mounting bracket 20 is constructed of a rigid material such as, but not limited to, metal.

The mounting bracket 20 further preferably includes a first side bracket 22 and a second side bracket 24 that extend outwardly from the mounting bracket 20 to pivotally connect to the bench 42. The first side bracket 22 is positioned on the left side of the bench 42 and the second side bracket 24 is positioned on the right side of the bench 42. It is understood that various other configurations may be used for the mounting bracket 20 and that the mounting bracket 20 may be comprised of any structure capable of pivotally connecting the bench 42 to a wall 12.

C. Bench.

The bench 42 includes a first surface that is adapted to support a torso of an exerciser when in the extended position. The first surface may be comprised of a cushion or non-cushion structure. The bench 42 includes a front end, a rear end opposite of the front end, a left side and a right side opposite of the left side. The first surface is preferably flat and planar with a size and shape sufficient to properly support the torso of an exerciser during the performance of an exercise with or without a barbell or dumbbells (e.g. flat bench 42 press, incline bench 42 press, decline bench 42 press, dips, inclined dumbbell flies, declined dumbbell flies).

The bench 42 is pivotally connected to the mounting bracket 20 as illustrated in FIGS. 1 through 4a of the drawings. The bench 42 is preferably pivotally connected to the mounting bracket 20 about a horizontal axis to move in an up-to-down manner and vice-versa as illustrated in FIGS. 1 through 9 of the drawings. However, the bench 42 may be pivotally connected to the mounting bracket 20 in other manners including, but not limited to, about a vertical axis wherein the bench 42 would move in a side-to-side manner instead of an up-to-down manner.

Figure 1B:
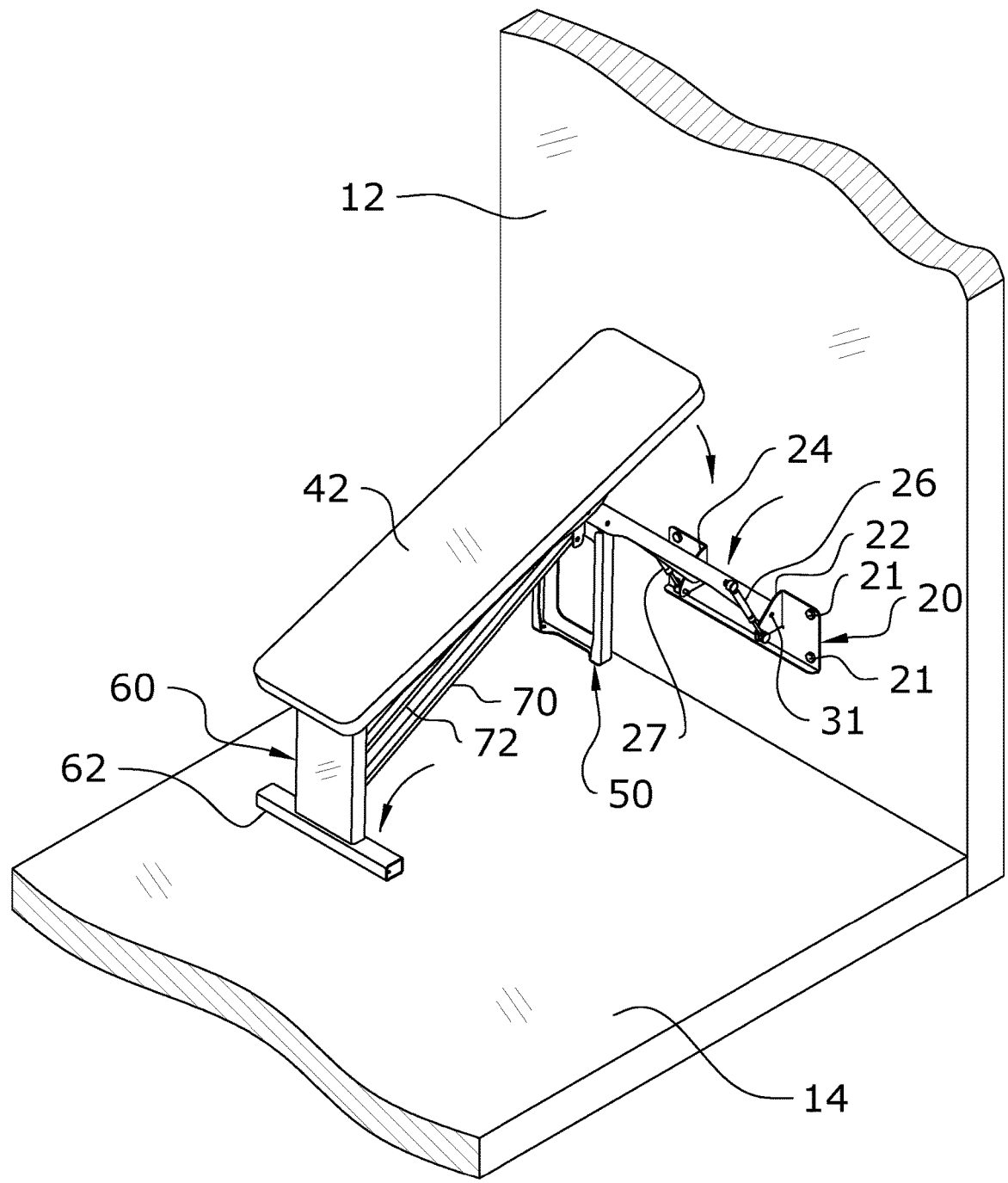
FIG. 1b is a perspective view of a retractable wall mounted weightlifting bench in an intermediate state in accordance with an example embodiment.
Figure 1C:
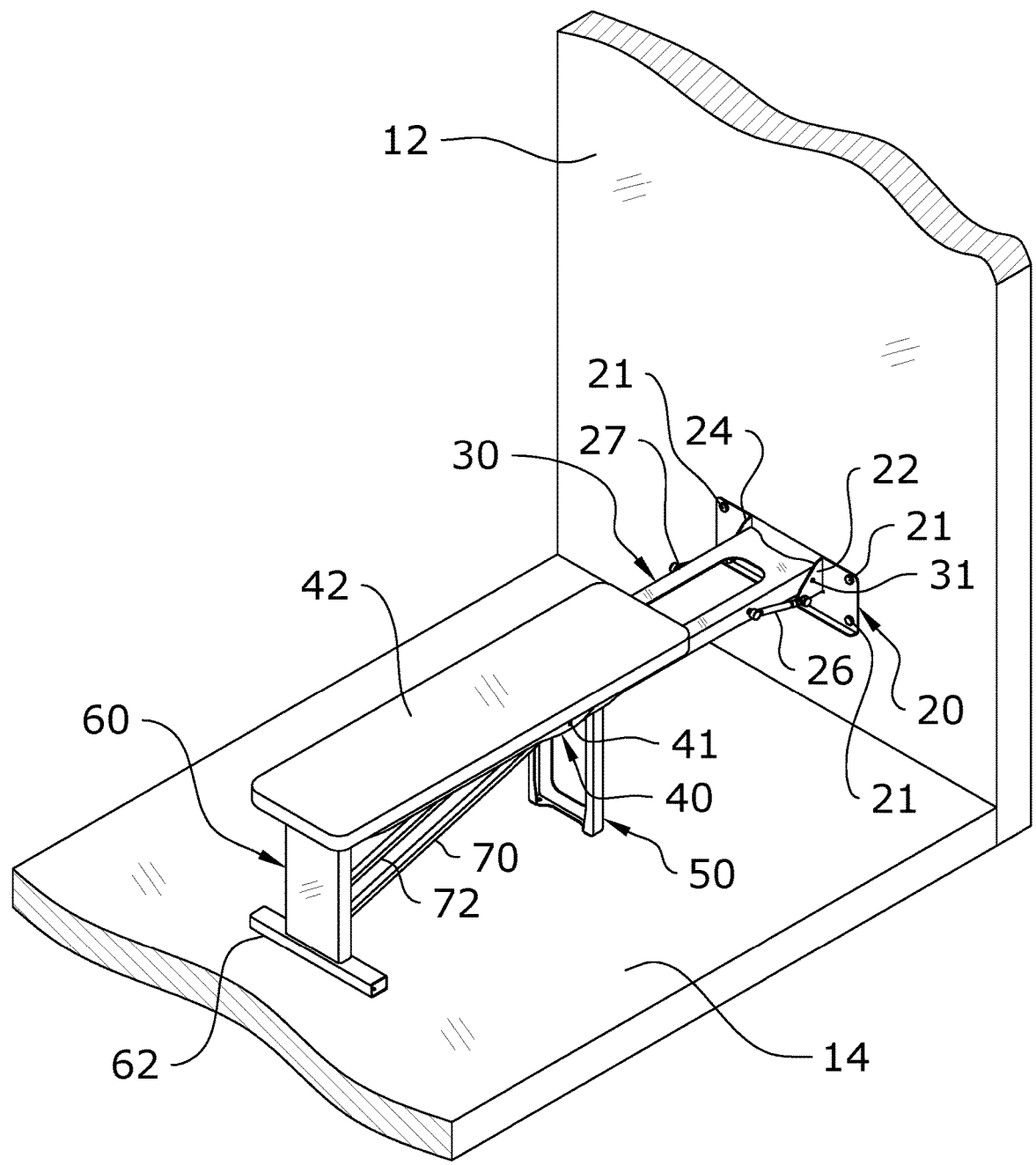
FIG. 1c is a perspective view of a retractable wall mounted weightlifting bench in an extended state in accordance with an example embodiment.
Figure 6:
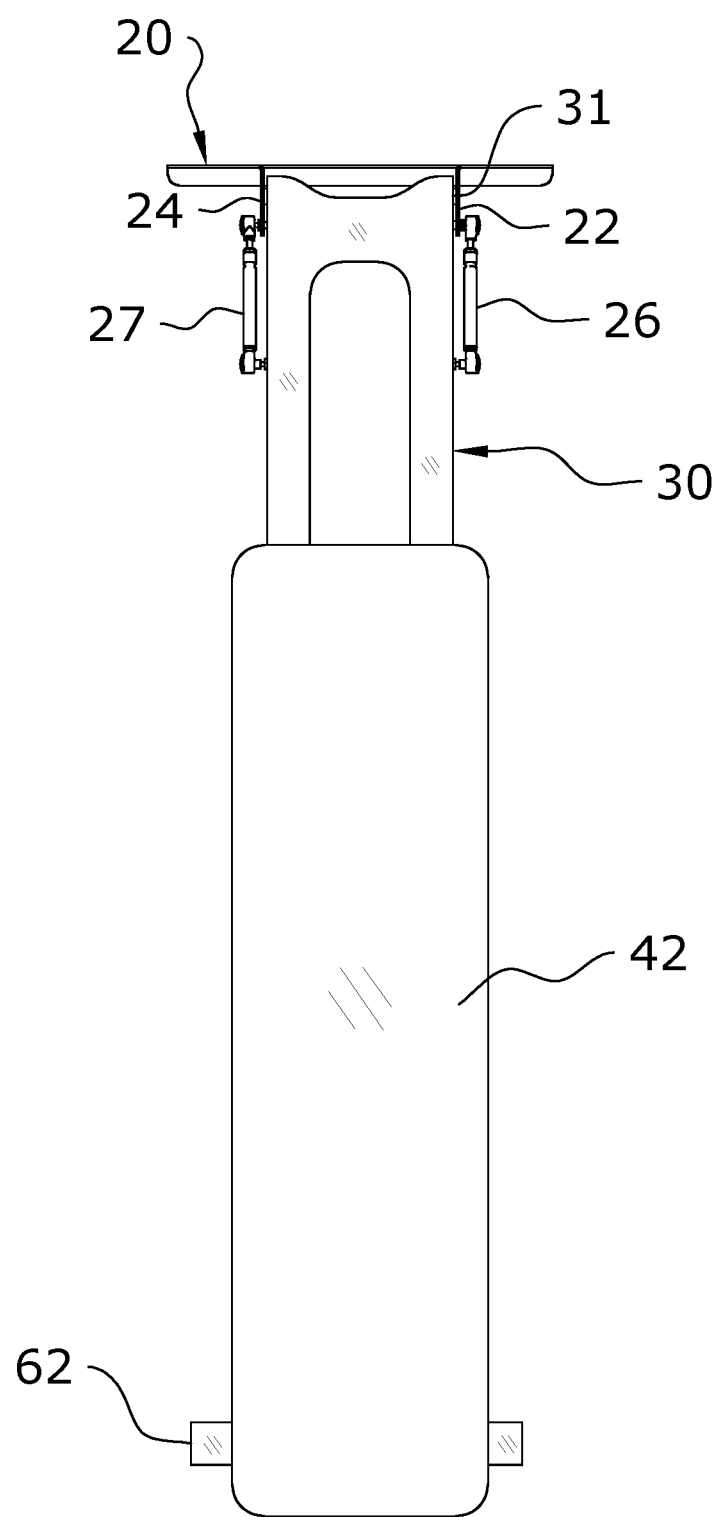
FIG. 6 is a top view of a retractable wall mounted weightlifting bench in an extended state in accordance with an example embodiment.
Figure 7:
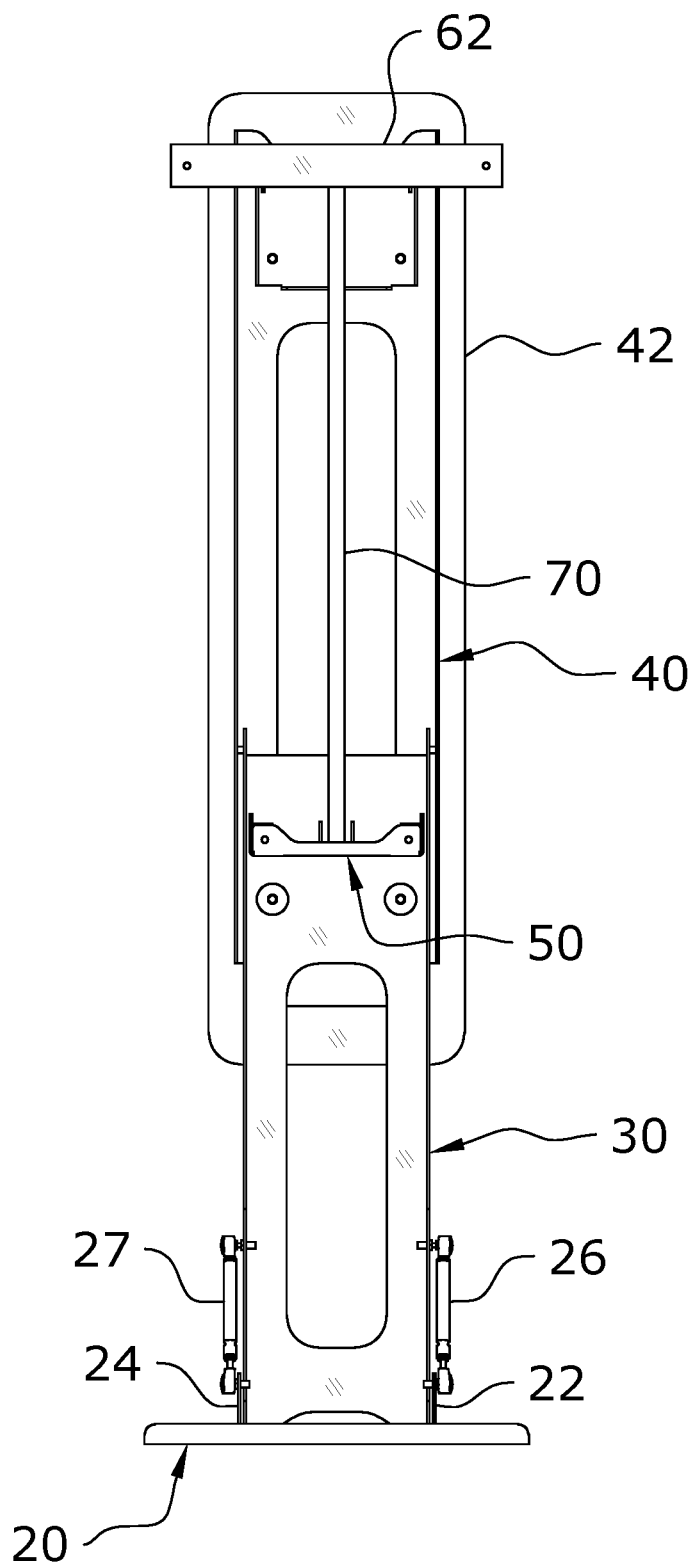
FIG. 7 is a bottom view of a retractable wall mounted weightlifting bench in an extended state in accordance with an example embodiment.
Figure 8:
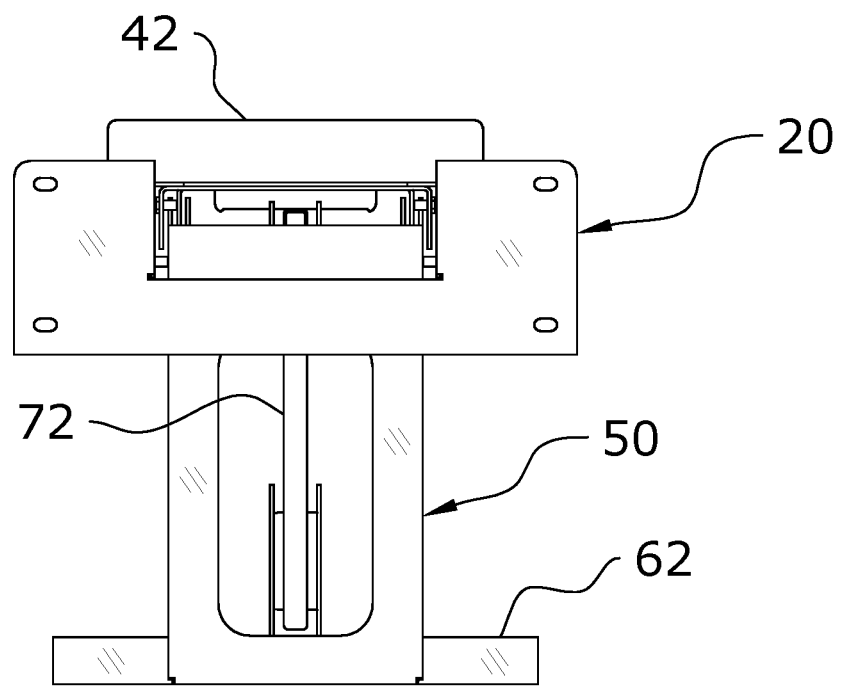
FIG. 8 is a rear view of a retractable wall mounted weightlifting bench in an extended state in accordance with an example embodiment.
Figure 9:
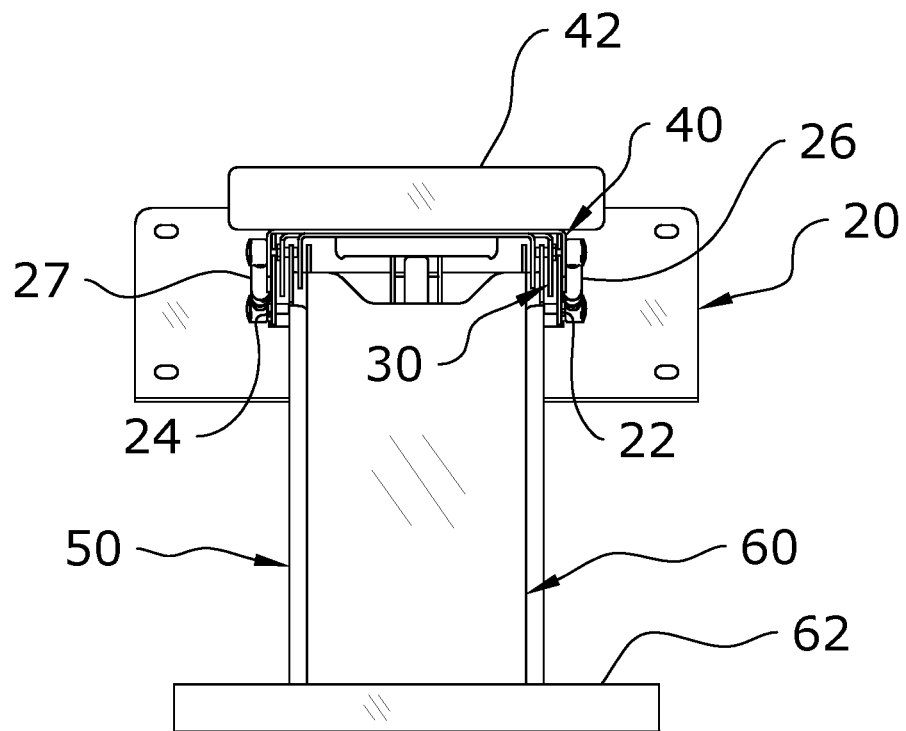
FIG. 9 is a front view of a retractable wall mounted weightlifting bench in an extended state in accordance with an example embodiment.

The first surface of bench 42 has an elongated structure that has a length, a width and a longitudinal axis. The length of the first surface of the bench 42 is greater than the width of the first surface of the bench 42 as best illustrated in FIG. 6 of the drawings. When the bench 42 is in the extended position, the first surface is the upper surface of the bench 42 that the exerciser positions the torso of their body upon to perform the exercise as illustrated in FIG. 1c. When the bench 42 is in the retracted position, the first surface is either facing outwardly from the wall 12 as shown in FIG. 1a or inwardly toward the wall 12 (not shown) depending upon the configuration of the pivoting system for the bench 42.

Figure 2A:
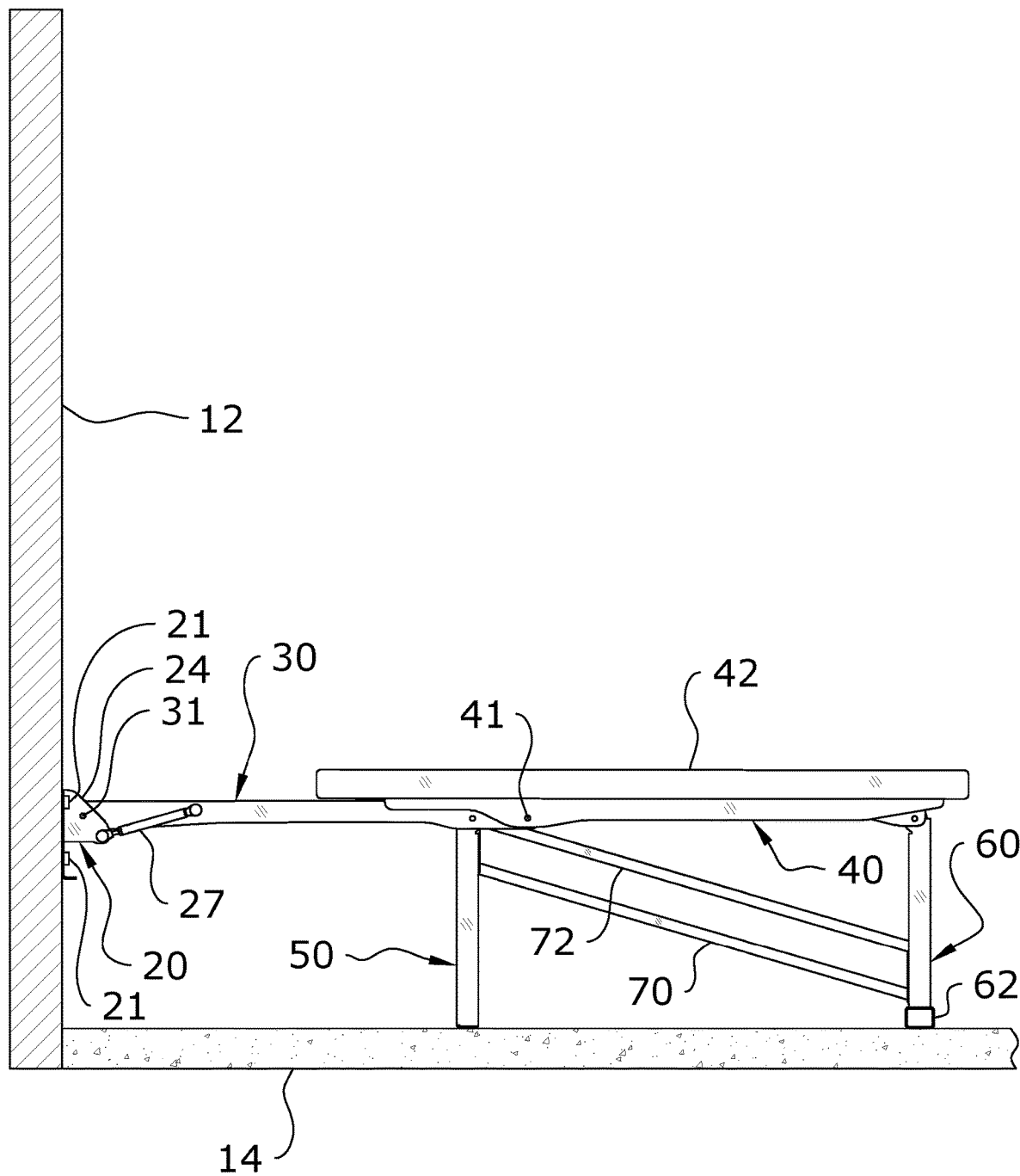
FIG. 2a is a side view of a retractable wall mounted weightlifting bench attached to a wall in an extended state in accordance with an example embodiment.
Figure 11:
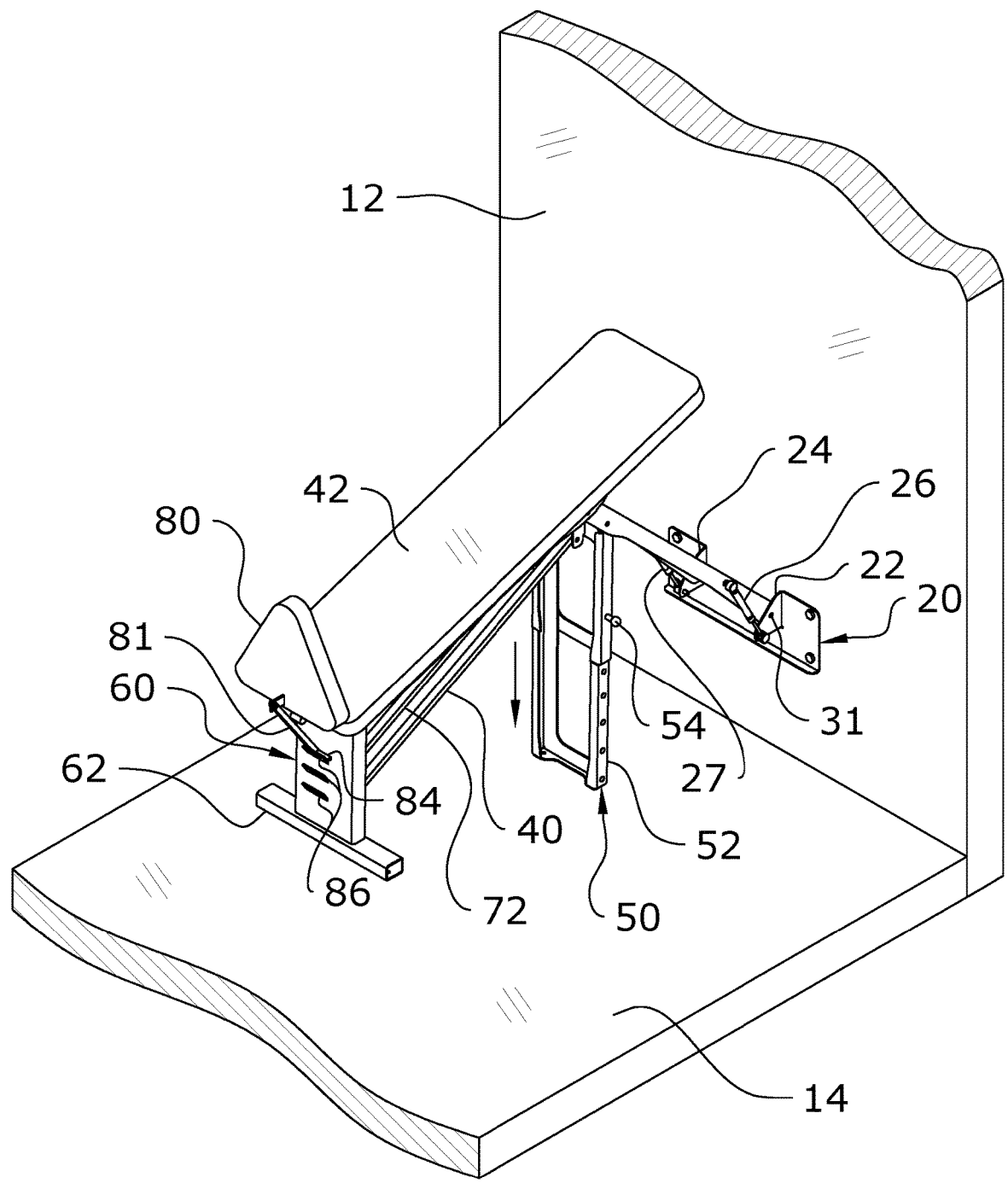
FIG. 11 is a perspective view of a retractable wall mounted weightlifting bench attached to a wall in an extended state with the bench at an incline in accordance with an example embodiment.
Figure 12:
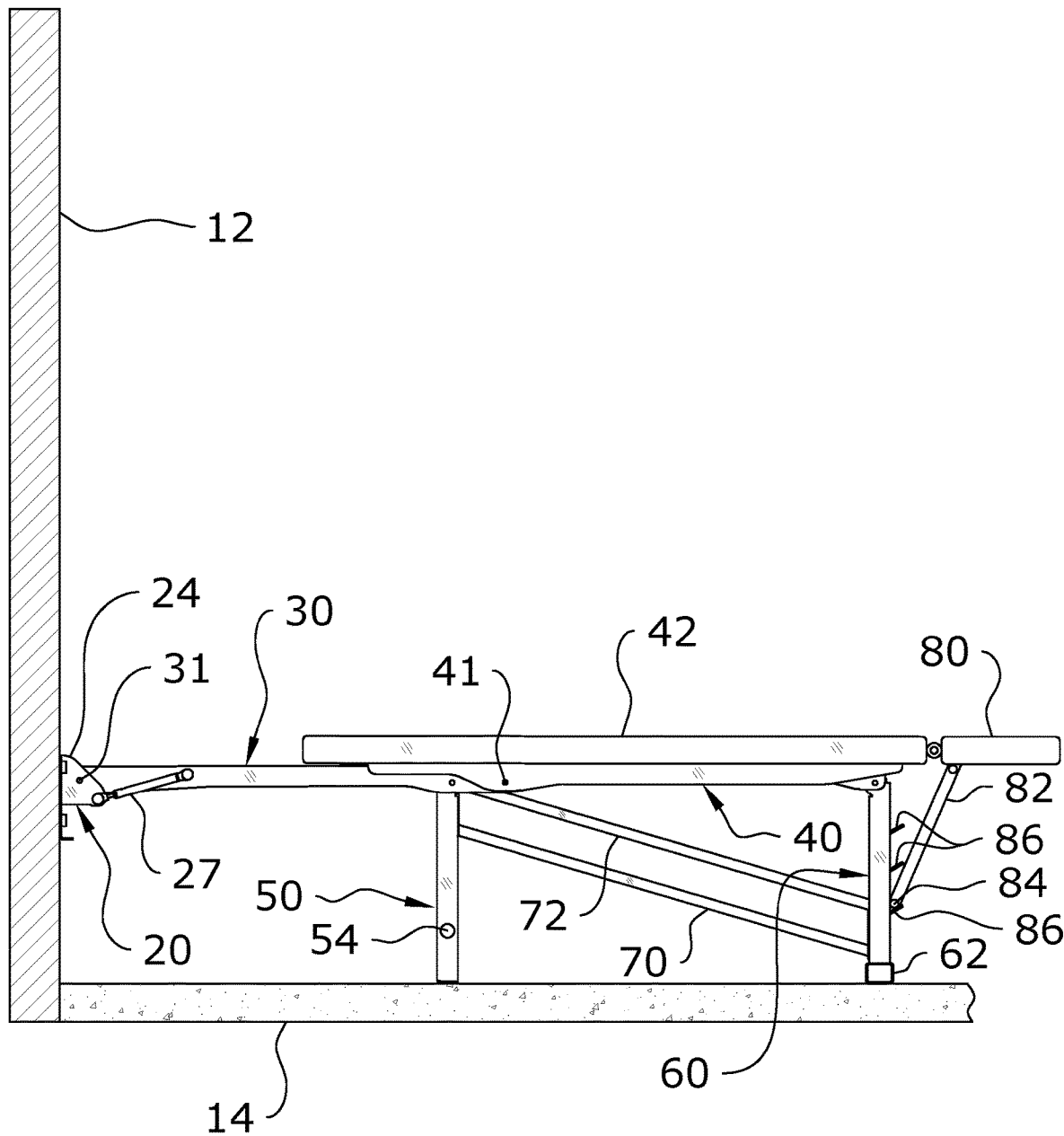
FIG. 12 is a side view of a retractable wall mounted weightlifting bench attached to a wall in an extended state with the bench substantially horizontal in accordance with an example embodiment.
Figure 13:
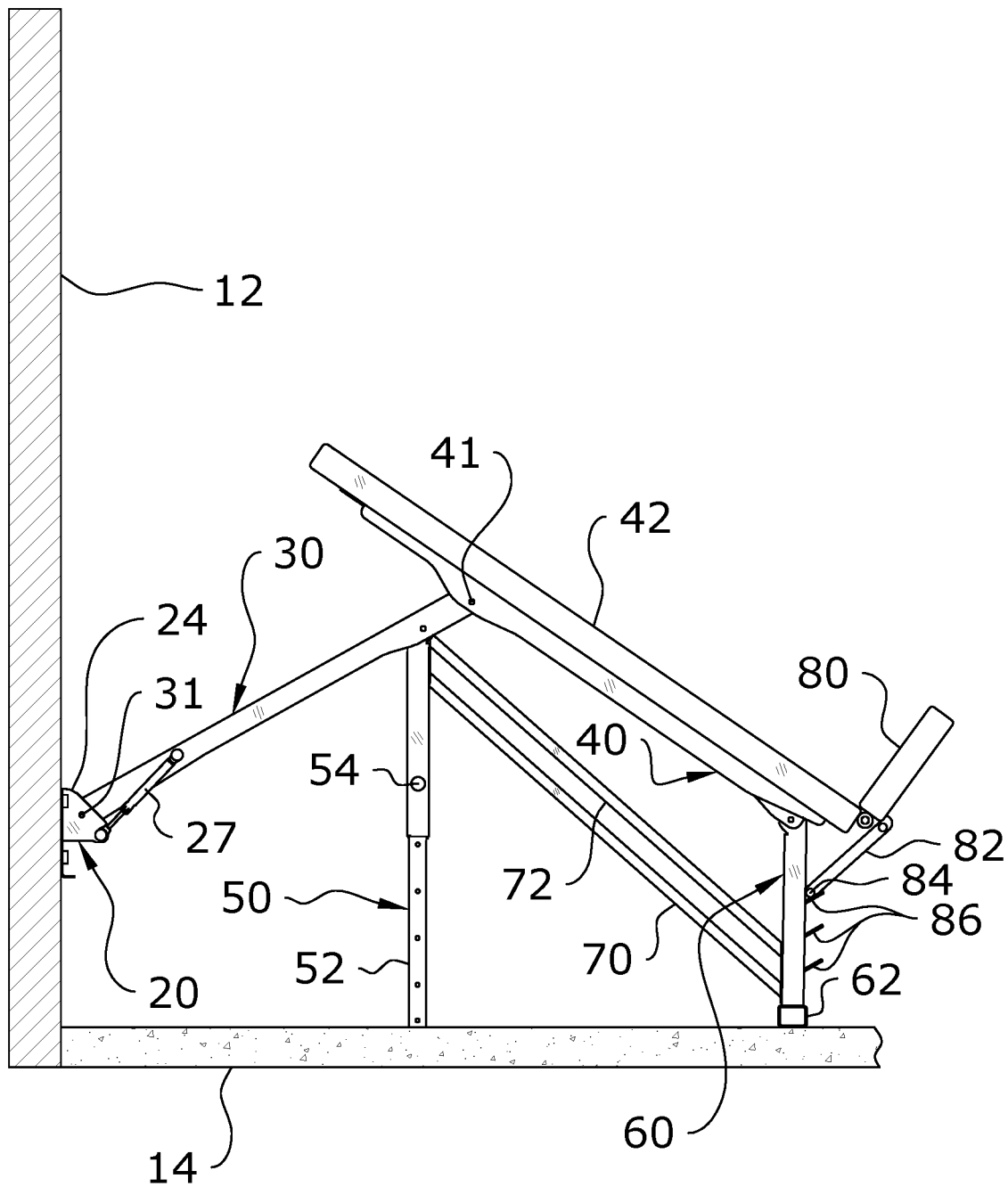
FIG. 13 is a side view of a retractable wall mounted weightlifting bench attached to a wall in an extended state with the bench at an incline in accordance with an example embodiment.

The bench 42 has an extended position as shown in FIGS. 1c, 2a, 11, 12 and 13 of the drawings. In the extended position, the bench 42 is usable to perform various types of exercises traditionally performed on a weightlifting bench 42. The first surface of the bench 42 may have a horizontal alignment when the bench 42 is in the extended position as shown in FIGS. 1c and 2a of the drawings. Alternatively, the first surface of the bench 42 may have an inclined (or declined) alignment when the bench 42 is in the extended position as shown in FIGS. 11 and 13 of the drawings.

The longitudinal axis of the bench 42 preferably extends in a direction that is tangential to the wall 12 when the bench 42 is in the extended position as shown in FIG. 1c of the drawings. However, the bench 42 may extend in a direction that is otherwise angled and not tangential with respect to the wall 12 when in the extended position.

Figure 2B:
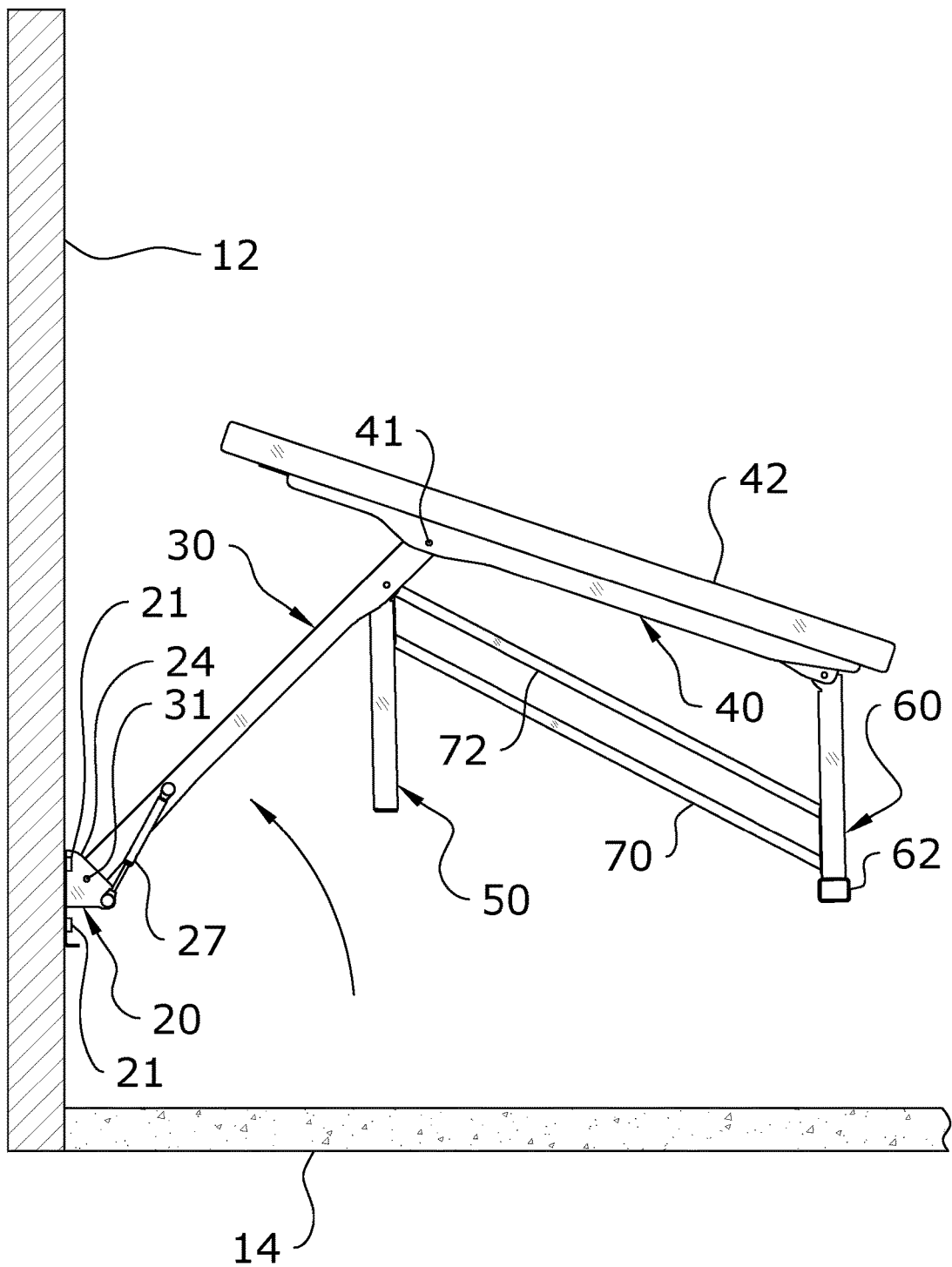
FIG. 2b is a side view of a retractable wall mounted weightlifting bench in an intermediate state in accordance with an example embodiment.
Figure 2C:
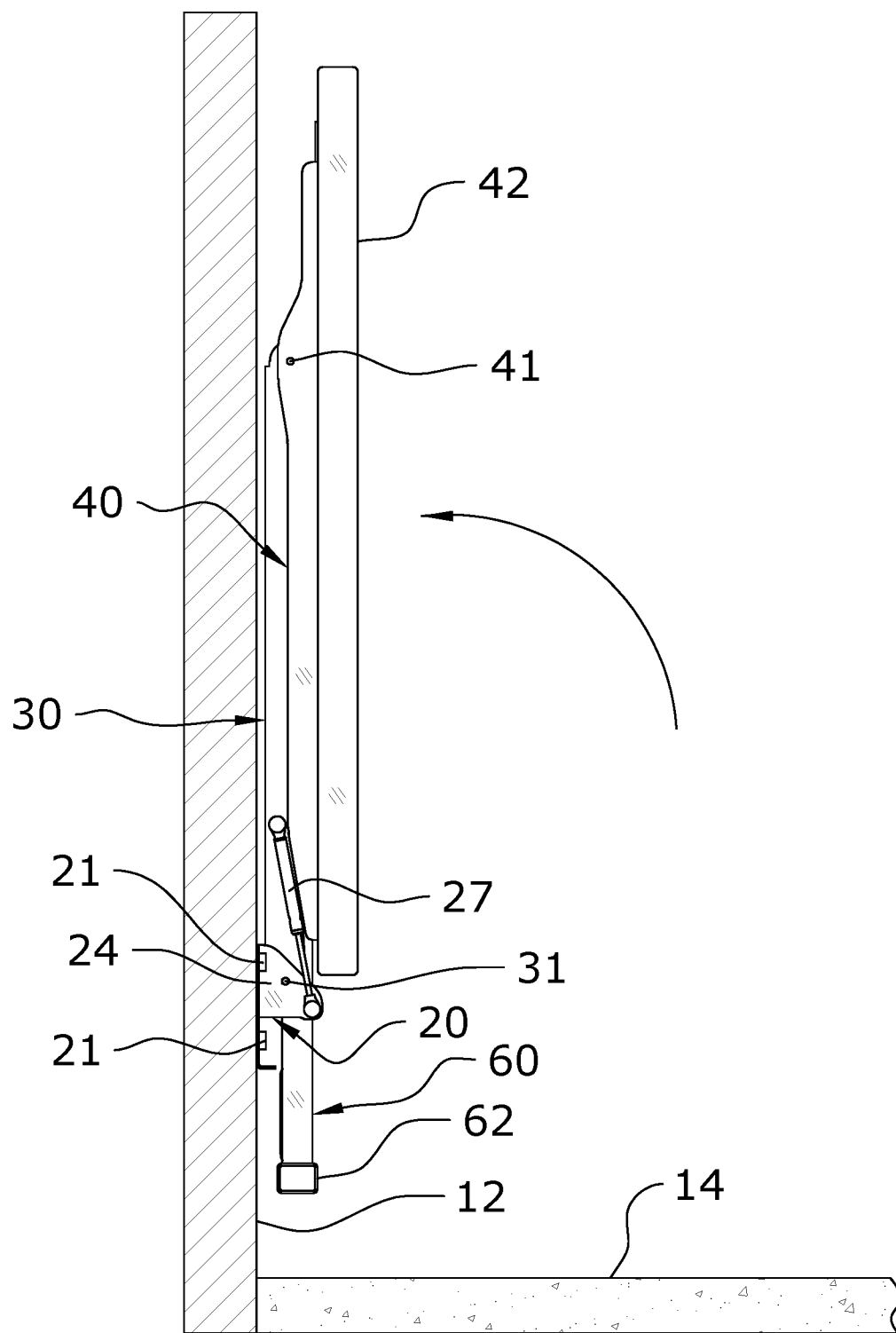
FIG. 2c is a side view of a retractable wall mounted weightlifting bench in a retracted state in accordance with an example embodiment.
Figure 3:
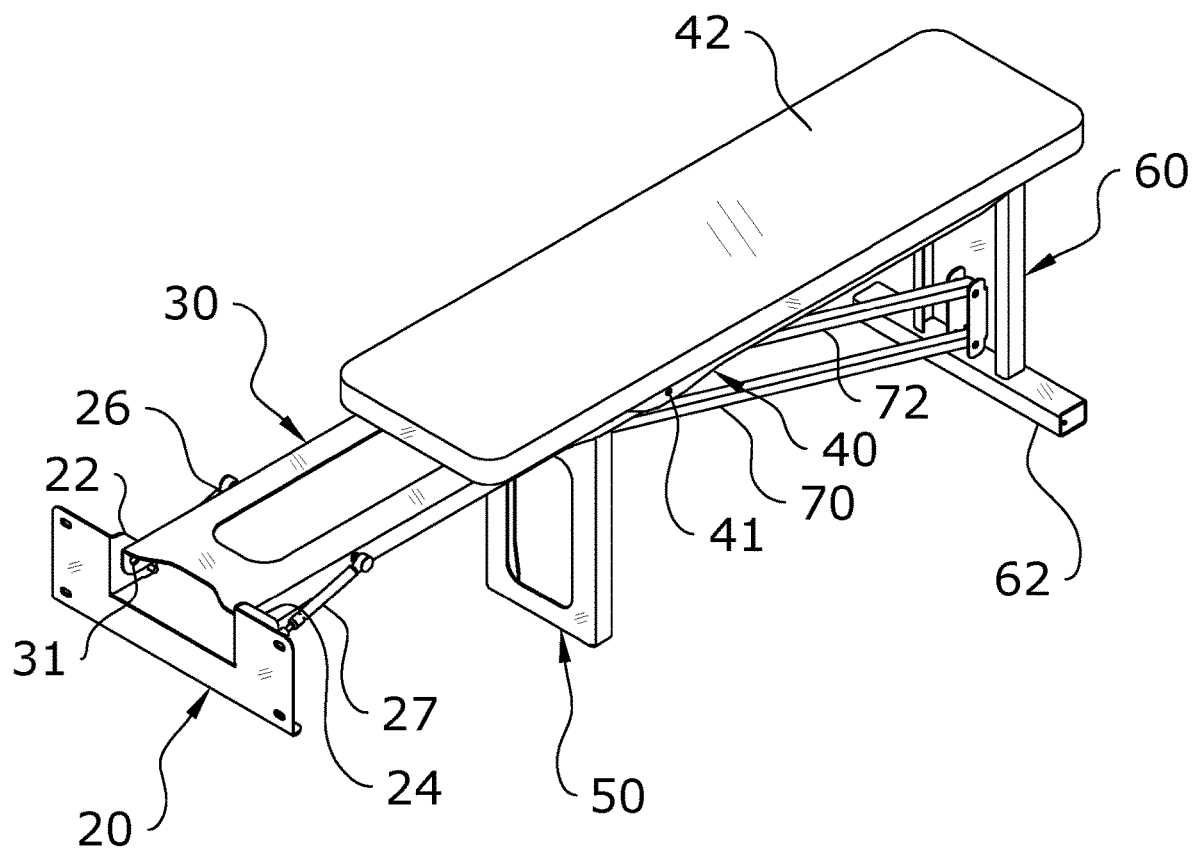
FIG. 3 is a rear perspective view of a retractable wall mounted weightlifting bench in an extended state in accordance with an example embodiment.
Figure 4A:
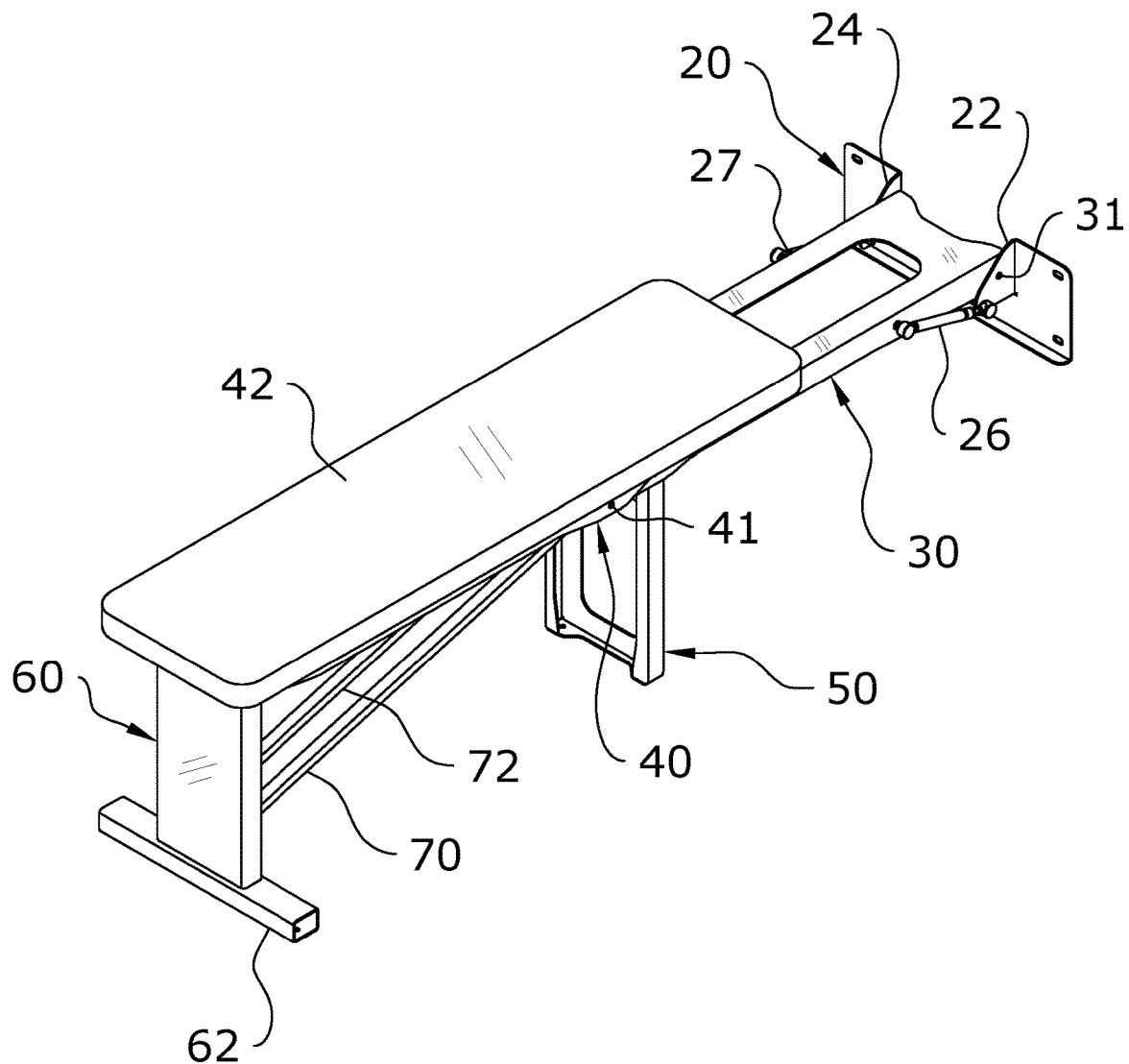
FIG. 4a is a front perspective view of a retractable wall mounted weightlifting bench in an extended state in accordance with an example embodiment.
Figure 4B:
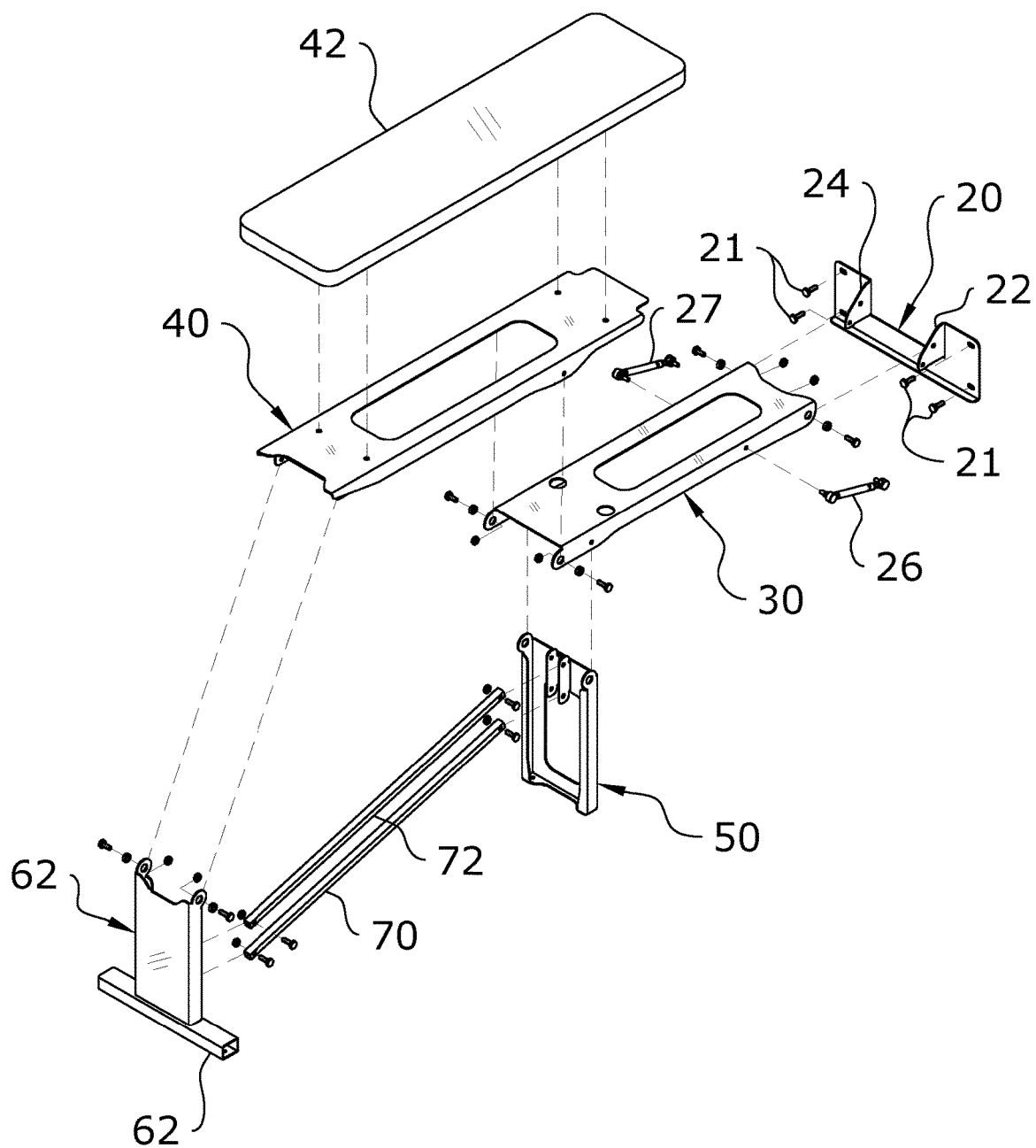
FIG. 4b is an exploded front perspective view of a retractable wall mounted weightlifting bench in an extended state in accordance with an example embodiment.
Figure 5:
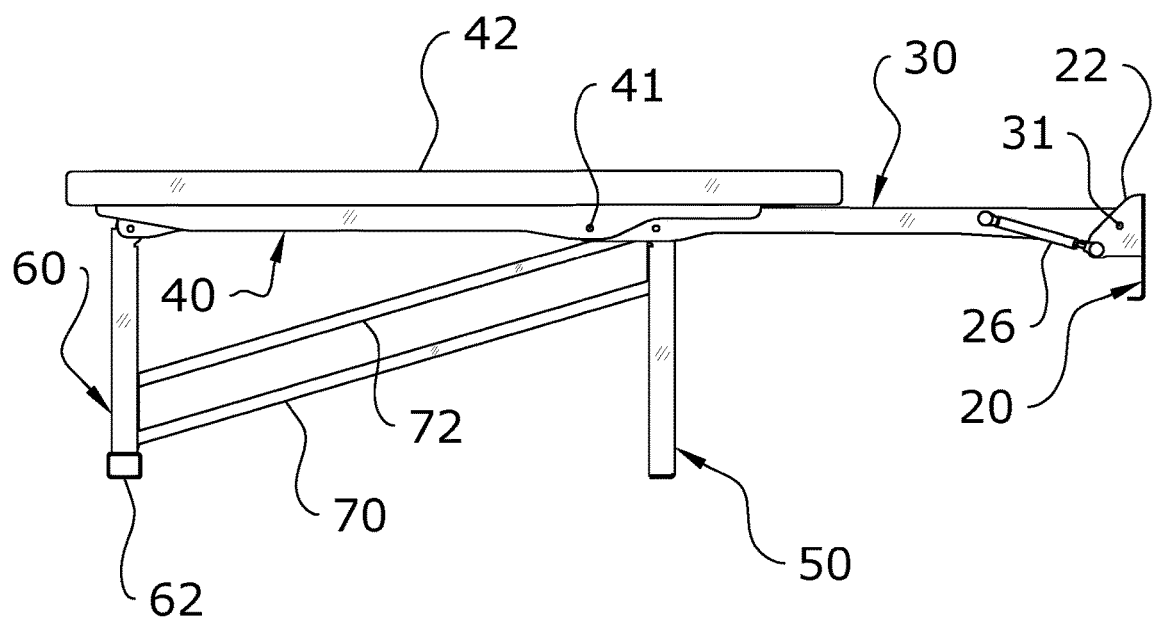
FIG. 5 is a left side view of a retractable wall mounted weightlifting bench in an extended state in accordance with an example embodiment.

The front end of the bench 42 is distally positioned away from the wall 12 when the bench 42 is in the extended position. The rear end of the bench 42 is also preferably distally positioned away from the wall 12 when the bench 42 is in the extended position, but the rear end of the bench 42 is closer to the wall 12 than the front end of the bench 42 when the bench 42 is in the extended position as shown in FIG. 2a of the drawings. The distance from the wall 12 to the front end of the bench 42 is significantly less when the bench 42 is in the retracted position than when the bench 42 is in the extended position as shown in FIGS. 2a and 2c of the drawings.

The bench 42 further has a retracted position to store the bench 42 in a compact state with limited space usage. The bench 42 is positioned near, adjacent or touching the wall 12 when in the retracted position as illustrated in FIGS. 1a and 2c of the drawings. The longitudinal axis of the bench 42 preferably extends in a direction that is parallel to the wall 12 when the bench 42 is in the retracted position as best illustrated in FIG. 2c of the drawings. Though not required, the bench 42 is preferably positioned higher above the floor 14 when in the retracted position than when the bench 42 is in the extended position as shown in FIGS. 2a and 2c of the drawings. The bench 42 is preferably substantially vertically orientated when in the retracted position to provide for a compact position that is substantially flat near or against the outer surface of the wall 12 as shown in FIGS. 1a and 2c of the drawings. Alternatively, the bench 42 may be substantially flat near or against the wall 12 in a horizontal alignment which is not shown in the drawings.

The bench 42 may be comprised of a single structure configuration that is pivotally attached to the mounting bracket 20 (not shown) or a multi-structure configuration that is pivotally attached to the mounting bracket 20. FIGS. 1a through 15 of the drawings illustrate a multi-structure configuration for the bench 42 that is foldable upon itself to provide a compact structure with respect to the wall 12 when in the retracted position and an extended structure away from the wall 12 when in the extended position.

In one embodiment, the bench 42 is comprised of a first segment 30 pivotally connected to the hinge about a first hinge 31 and a second segment 40 pivotally connected to the first segment 30 about a second hinge 41. The second segment 40 supports the first surface of the bench 42 (e.g. a cushion or other type of platform structure to support the exerciser) as shown in FIGS. 1a through 2c of the drawings. The first segment 30 is used to extend the bench 42 away from the wall 12 when the bench 42 is in the extended position to allow for the performance of exercises with dumbbells or bars without interface with the wall 12 or any surrounding retractable rack.

The first segment 30 and the second segment 40 may each be comprised of a single unitary structure or multiple components to form the frame for the bench 42. For example, FIG. 1c illustrates the first segment 30 as having an end portion that pivotally connects to the mounting bracket 20 and a pair of support arms extending outwardly from the end portion in a parallel manner wherein the pair of support arms are pivotally connected to the second segment 40. The second segment 40 supports the first surface such as a cushion or platform that the exerciser positions their body upon during the performance of an exercise. The first segment 30 and the second segment 40 of the bench 42 are preferably substantially parallel with respect to one another in both the extended position and the retracted position for the bench 42 as best illustrated in FIGS. 2a and 2c. When the bench 42 is in the retracted position, the first segment 30 and the second segment 40 of the bench 42 are preferably folded upon themselves in an overlapping manner to provide a flatter profile with respect to the wall 12 as shown in FIG. 2c of the drawings. When the bench 42 is in the retracted position, the first surface of the bench 42 is preferably extends less than 6 inches outwardly from the wall 12 to provide a compact storage profile.

D. Folding Seat.

FIG. 11 illustrate an embodiment that includes a folding seat 80 pivotally attached to the front end of the bench 42 which allows for extension of the first surface of the bench 42 when in the horizontal state (FIG. 12) and that provides a seat for the exerciser with the remaining portion of the bench 42 supporting the back of the exerciser for when the bench 42 is in an inclined state (FIGS. 11 and 13). The folding seat 80 is pivotally connected via a hinge and includes an arm member 82 pivotally extending downwardly that selectively engages one of a plurality of extended members 86 that extend outwardly from the second support member 60 to adjust the state of the folding seat 80 from flat to angled with respect to the first surface of the bench 42 as shown in FIGS. 11 through 13 of the drawings. The arm member 82 includes an end member 84 that is preferably wider than the arm member 82 to selectively engage the upwardly-forwardly extending extended members 86. The folding seat 80 also preferably includes a cushion to increase the comfort of the exerciser during the performance of an exercise. The folding seat 80 is optional and not required for the invention.

E. Support Members.

FIGS. 1c, 2a, 3, 5 11 through 14 illustrate a first support member 50 and a second support member 60 pivotally attached to the bench 42. The support members engage the floor 14 or other type of ground surface to provide support to the bench 42 when in the extended position. The support members retract towards the bottom surface of the bench 42 when the bench 42 is in the retracted position to provide a compact storage structure when not in use. The support members each form a leg structure that supports the bench 42.

The first support member 50 is preferably positioned near the rear end of the bench 42 and the second support member 60 is preferably positioned near the front end of the bench 42. It can be appreciated that the support members may be positioned in various locations along the bench 42. The support members extend downwardly and are vertical when the bench 42 is in the extended position to provide support and elevate the first surface of the bench 42 above the floor 14 as illustrated in FIGS. 1c and 2a of the drawings. The first support member 50 is preferably pivotally connected to the first segment 30 of the bench 42 near the second hinge 41 as best illustrated in FIGS. 1b and 2b of the drawings. The second support member 60 is preferably pivotally connected to the second segment 40 of the bench 42 near the front end of the bench 42 as further shown in FIGS. 1b and 2b of the drawings. The second support member 60 includes a base member 62 and the first support member 50 may also include a base structure.

The first support member 50 and the second support member 60 are not substantially parallel to the first surface of the bench 42 when the bench 42 is in the extended position and instead extend in a downward vertical direction that is transverse to the first surface. The first support member 50 and the second support member 60 are preferably substantially parallel to the first surface of the bench 42 when the bench 42 is in the retracted position as illustrated in FIG. 2c of the drawings.

The lower end of the first support member 50 and the lower end of the second support member 60 are distally spaced above the floor 14 when in the retracted position as further shown in FIG. 2c of the drawings. The lower end of the first support member 50 and the lower end of the second support member 60 engage the floor 14 when the bench 42 is in the extended position to support the bench 42 above the floor 14 as shown in FIGS. 2a and 11 through 14 of the drawings.

To keep the first support member 50 and the second support member 60 aligned with one another, a first connector 70 and a second connector 72 preferably extend between the first support member 50 and the second support member 60 (pivotally connected thereto). The first connector 70 and the second connector 72 ensure than the support members are aligned parallel with respect to one another when the bench 42 is in the extended position and the retracted position. The first connector 70 and the second connector 72 are preferably parallel with respect to one another as illustrated in FIGS. 2a and 2b of the drawings.

The first support member 50 and the second support member 60 each preferably has approximately the same length when the support members are non-adjustable in length to provide for a level first surface of the bench 42 when in the extended position. However, the support members may have different lengths when non-adjustable to provide an inclined bench 42 structure (not shown). Alternatively, one or both of the support members may have an adjustable length to provide for an inclined bench 42 as shown in FIG. 13 or a declined bench 42 (not shown) as discussed further herein.

F. Adjustable Pitch Angle Bench Embodiment.

The pitch angle (i.e. incline or decline) of the bench 42 may be static or adjustable. FIGS. 11 through 13 illustrate an embodiment where the incline of the bench 42 is adjustable and not static. In an adjustable pitch angle embodiment, either or both of the first support member 50 or the second support member 60 may be adjustable in length to provide for a desired pitch angle for the bench 42. For example, the first support member 50 may include a telescoping leg 52 that is adjustable in length with respect to the main portion of the first support member 50. Moving the telescoping leg 52 upwardly or downwardly with respect to the main portion of the first support member 50 determines the height of the rear portion of the bench 42 thereby determining the pitch angle (incline or decline) of the bench 42. Various types of locking structures may be used to releasably lock the position of the telescoping leg 52 such as a locking device 54 (e.g. index plunger) that extends into a selected hole within the telescoping leg 52.

G. Retracted Position Retention Structures.

In one embodiment, a first actuator 26 is pivotally connected to the bench 42 and is adapted to be pivotally connected directly to the wall 12 or mounting bracket 20. The first actuator 26 applies an upward biasing force to the bench 42 to assist in lifting the bench 42 upwardly into the retracted position and to keep the bench 42 in the retracted position once the bench 42 is in the vertical storage position as shown in FIG. 2c of the drawings. A second actuator 27 may also be pivotally connected to the bench 42 that is adapted to be pivotally connected to the wall 12 or mounting bracket 20. The second actuator 27 applies an upward biasing force to the bench 42 to assist in lifting the bench 42 upwardly into the retracted position and to keep the bench 42 in the retracted position once the bench 42 is in the vertical storage position as shown in FIG. 2c of the drawings. The first actuator 26 and the second actuator 27 may be comprised of various types of actuators that provide a biasing force such as, but not limited to, linear actuators. Examples of suitable linear actuators include, but are not limited to, gas actuators, gas springs, pneumatic actuators, hydraulic actuators, hydraulic gas lift support arms, spring actuators, mechanical compression struts, compression actuators, dampers and the like. The actuators may also be rotary actuators such as, but not limited to, torsion springs, coil springs and the like. The actuators may be motorized such as an electro-mechanical actuator or servomotor actuator to lift the present invention from the extended position to the retracted position without the user having to lift the structure. In addition, a ratchet system may be connected to the arms to prevent the rack system from lowering during a lifting procedure.

Figure 14:
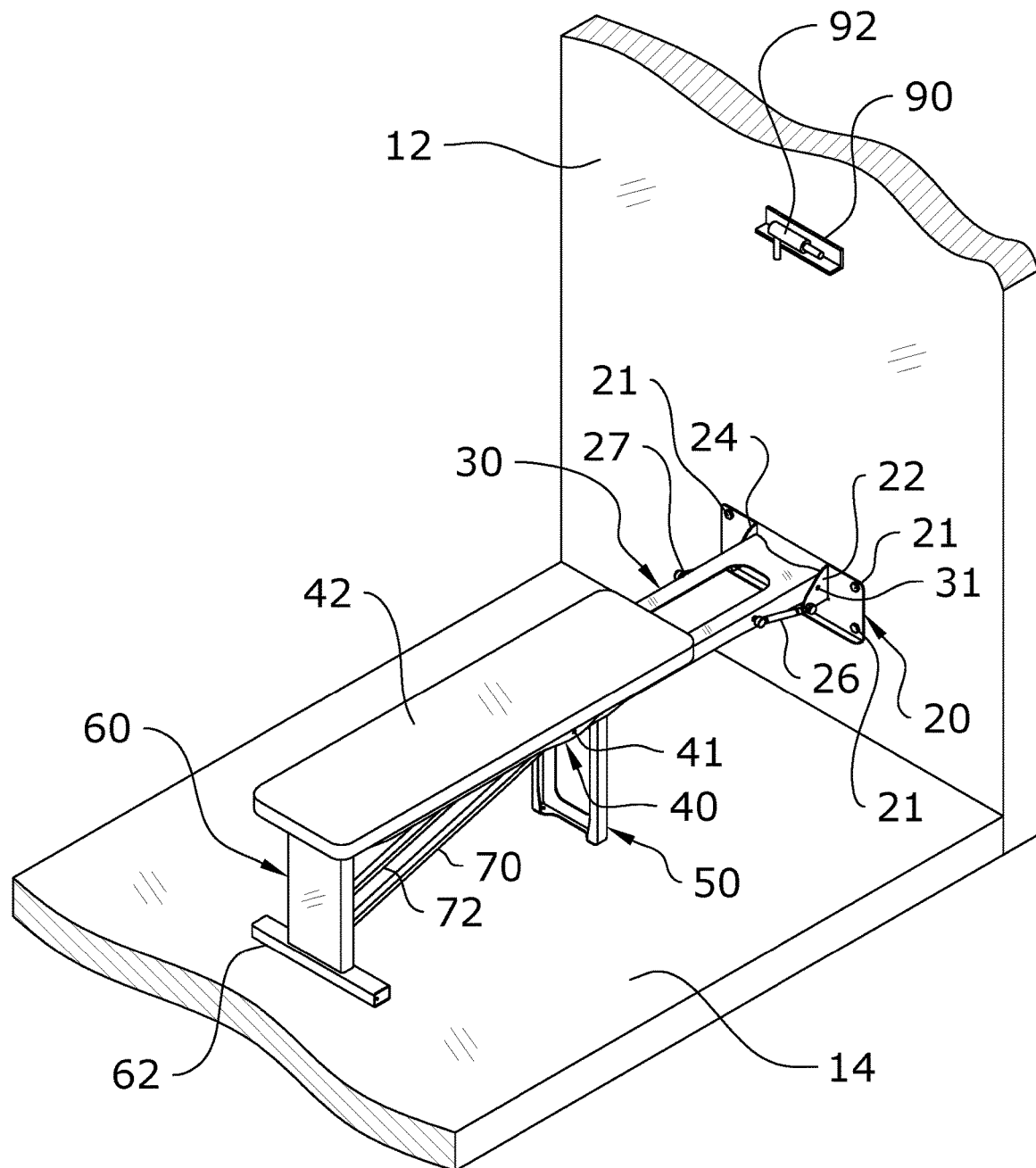
FIG. 14 is a perspective view of a retractable wall mounted weightlifting bench attached to a wall in an extended state in accordance with an example embodiment.
Figure 15:
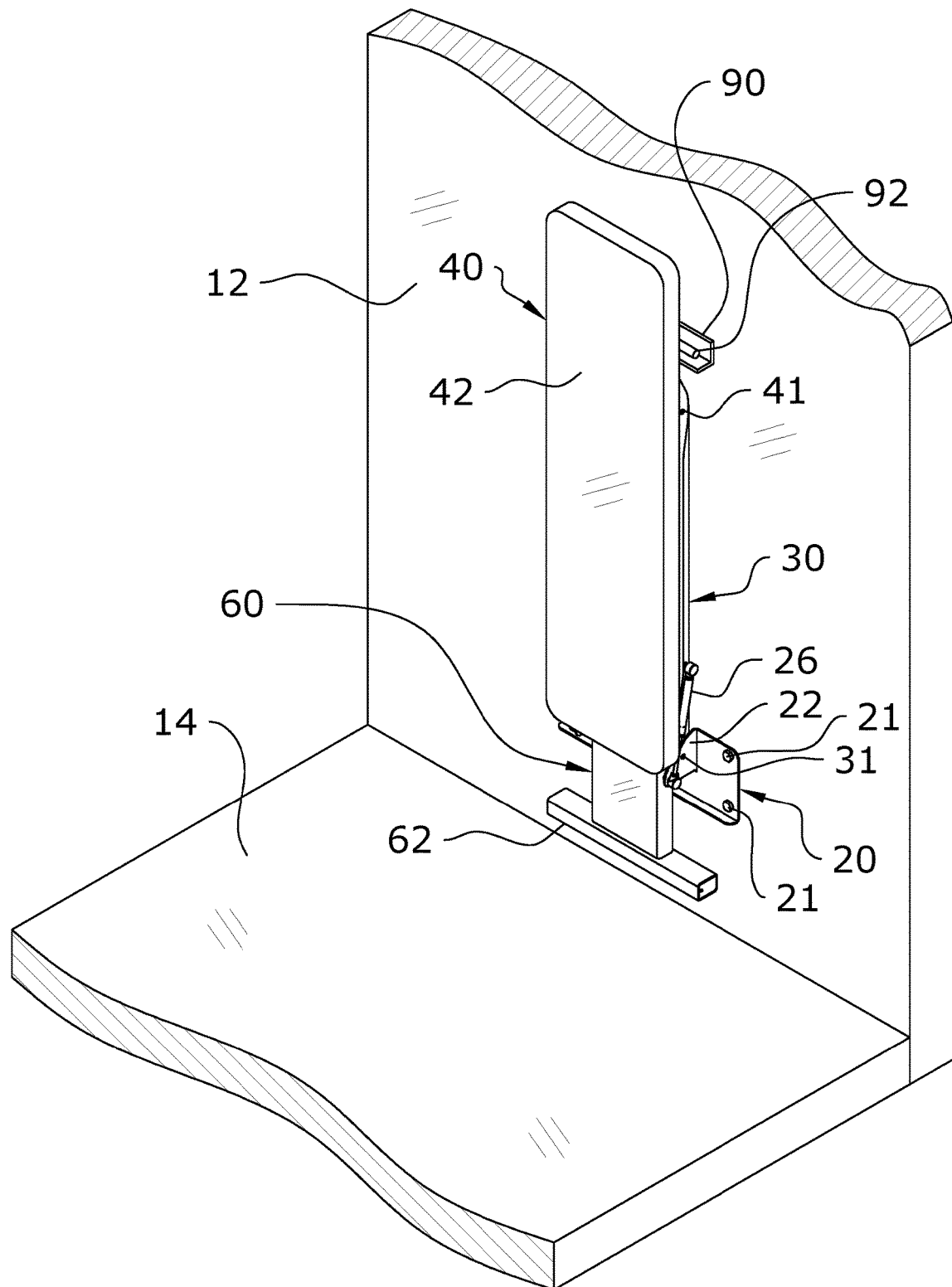
FIG. 15 is a perspective view of a retractable wall mounted weightlifting bench attached to a wall in a retracted state in accordance with an example embodiment.

Alternatively to or in addition to the actuators 26, 27, a holding bracket 90 may be provided that is adapted to be attached to the wall 12 above the mounting bracket 20 for selectively connecting to the bench 42 when the bench 42 is in the retracted position to prevent the bench 42 from leaving the retracted position as shown in FIGS. 14 and 15 of the drawings. A connector (e.g. loop, hook, eyelet, etc.) is attached to the bench 42 that removably connects to the holding bracket 90 when the bench 42 is in the retracted position to prevent the bench 42 from moving out of the retracted position. The connector may be movable or non-movable with respect to the bench 42.

In an embodiment, a connecting member 92 is movably connected to the holding bracket 90 to selectively engage the bench 42 when in the retracted position. The connecting member 92 is adapted to selectively engage the connector to prevent the bench 42 from moving out of the retracted position. FIG. 14 illustrates the connecting member 92 as a sliding device but the connecting member 92 may be a stationary device such as a loop or hook.

H. Operation of Preferred Embodiment.

Figure 10:
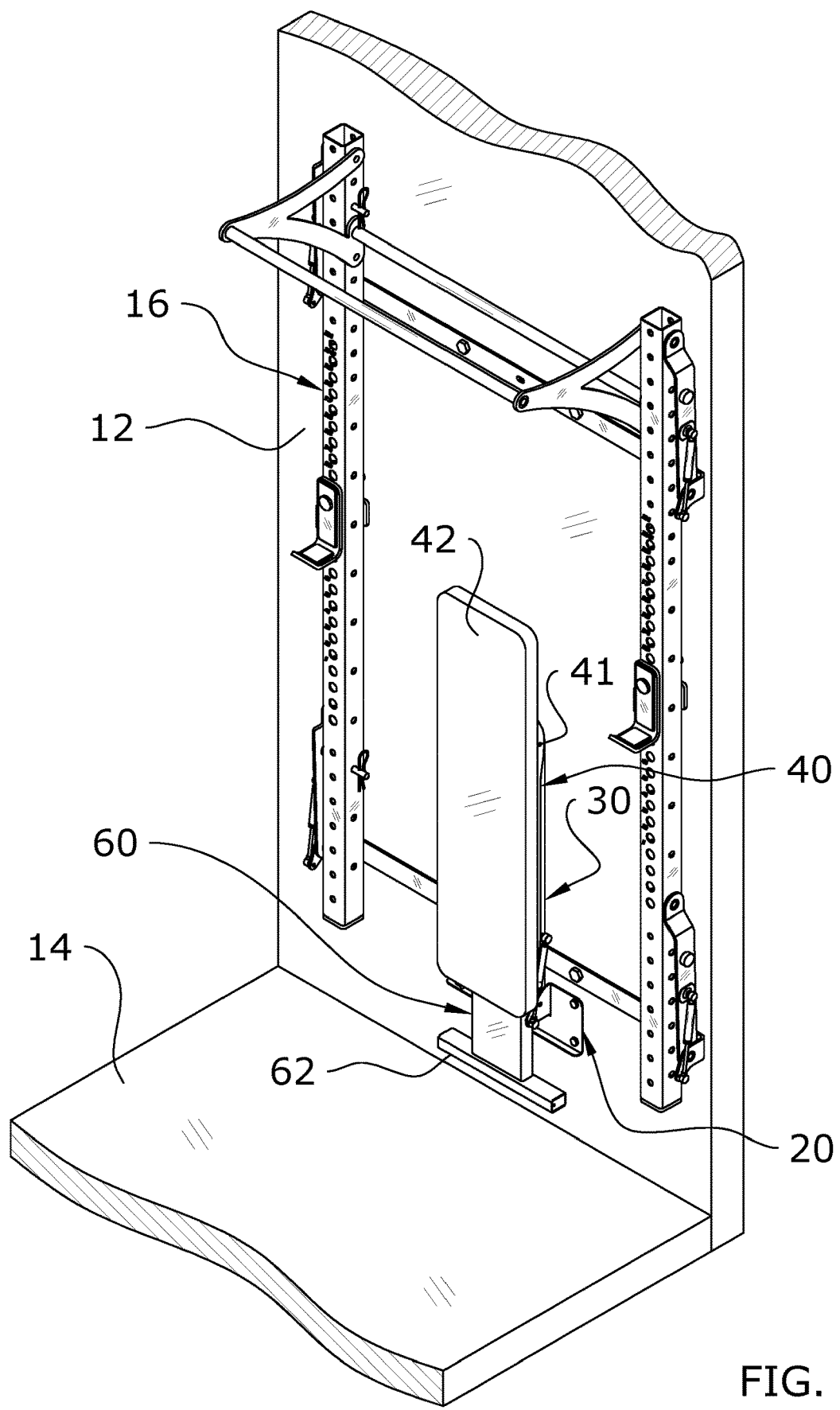
FIG. 10 is a perspective view of a retractable wall mounted weightlifting bench attached to a wall in a retracted state positioned between a wall mounted weightlifting rack also in a retracted state in accordance with an example embodiment.

In use, the mounting bracket 20 is attached to the wall 12 with fasteners 21 as shown in FIGS. 1a through 2c and 10 through 15 of the drawings. The mounting bracket 20 is positioned a height above the floor 14 corresponding to the height of the support members as shown in FIG. 2a of the drawings. The mounting bracket 20 may be attached to a wall 12 with no exercise equipment, or the mounting bracket 20 may be attached between a retractable wall mounted exercise rack 16 such as shown in FIG. 10 of the drawings. U.S. Pat. No. 9,333,387 illustrates an exemplary retractable wall mounted exercise rack 16 suitable for use in conjunction with the embodiments of the present invention and is hereby incorporated by reference.

Once the retractable wall mounted weightlifting bench 42 is attached to the wall 12 and in the compact retracted position shown in FIG. 1a of the drawings, the exerciser is then able to use the weightlifting bench 42 as desired by pulling the bench 42 downwardly (or moving sideways depending upon the pivot axis used for the first hinge 31). The exerciser moves the bench 42 into the extended position which extends outwardly from the wall 12 in a horizontal manner (FIGS. 1c and 2a), an inclined manner (FIGS. 11 and 13), or a declined manner (not shown). If using an adjustable pitch angle embodiment, the user will adjust the length of the first support member 50 and/or the second support member 60 to achieve the desired height of the front end and the rear end of the bench 42 resulting in a desired pitch angle for the bench 42. In an embodiment with a folding seat 80, the exerciser will adjust the folding seat 80 to a desired angle depending upon the exercise to be performed. The exerciser then performs the exercise using the bench 42 as desired. The exerciser may adjust the pitch angle of the bench 42 at various times to perform different exercises. Once finished with the performance of exercises, the exerciser then moves the bench 42 back into the retracted position to reduce the amount of space used up by the bench 42 by lifting upwardly on the bench 42 so the bench 42 enters an intermediate position (FIGS. 1b and 2b) then continues to move the bench 42 toward the wall 12 until the bench 42 is substantially parallel with respect to the wall 12 (FIGS. 1a and 2c).

Unless otherwise defined, all technical and scientific terms used herein have the same meaning as commonly understood by one of ordinary skill in the art to which this invention belongs. Although methods and materials similar to or equivalent to those described herein can be used in the practice or testing of the retractable wall mounted weightlifting bench system, suitable methods and materials are described above. All publications, patent applications, patents, and other references mentioned herein are incorporated by reference in their entirety to the extent allowed by applicable law and regulations. The retractable wall mounted weightlifting bench system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A retractable wall mountable weightlifting bench, comprising:
   a mounting bracket adapted to be attached to a wall;
   a bench having a front end, a rear end opposite of the front end, a left side and a right side opposite of the left side, wherein the bench is pivotally connected to the mounting bracket about a horizontal axis, wherein the bench has an elongated structure that has a length, a width and a longitudinal axis, wherein the length is greater than the width of the bench, and wherein the bench includes a first surface;
   wherein the bench has an extended position and a retracted position;
   wherein the first surface of the bench is horizontal when in the extended position;
   wherein the first surface of the bench is adapted to support a torso of an exerciser when in the extended position;
   wherein the bench is positioned near the wall when in the retracted position;
   wherein the front end of the bench is distally positioned away from the wall when the bench is in the extended position;
   wherein the rear end of the bench is closer to the wall than the front end of the bench when the bench is in the extended position;
   wherein the bench is vertically orientated when in the retracted position;
   wherein a distance from the wall to the front end of the bench is less when the bench is in the retracted position than when the bench is in the extended position; and
   a support member pivotally attached to the bench about a horizontal axis;
   wherein the support member is not parallel to the first surface of the bench when the bench is in the extended position;
   wherein the support member is parallel to the first surface of the bench when the bench is in the retracted position;
   wherein a lower end of the support member is distally spaced above a floor when in the retracted position;
   wherein the lower end of the support member engages the floor when the bench is in the extended position.

2. The retractable wall mountable weightlifting bench of claim 1, including a first actuator pivotally connected to the bench, wherein the first actuator is adapted to be pivotally connected to the wall or the mounting bracket, and wherein the first actuator applies an upward biasing force to the bench to assist in lifting the bench upwardly into the retracted position.

3. The retractable wall mountable weightlifting bench of claim 2, including a second actuator pivotally connected to the bench, wherein the second actuator is adapted to be pivotally connected to the wall or the mounting bracket, and wherein the second actuator applies an upward biasing force to the bench to assist in lifting the bench upwardly into the retracted position.

4. The retractable wall mountable weightlifting bench of claim 1, wherein the bench is positioned higher when in the retracted position than when the bench is in the extended position.

5. The retractable wall mountable weightlifting bench of claim 1, wherein a lower end of the support member is distally spaced above a floor when in the retracted position.

6. The retractable wall mountable weightlifting bench of claim 1, wherein a longitudinal axis of the bench extends in a direction that is tangential to the wall when the bench is in the extended position.

7. The retractable wall mountable weightlifting bench of claim 6, wherein the longitudinal axis of the bench extends in a direction that is parallel to the wall when the bench is in the retracted position.

8. The retractable wall mountable weightlifting bench of claim 1, including a seat connected to the bench near the front end of the bench.

9. The retractable wall mountable weightlifting bench of claim 1, wherein the support member is connected to the bench near the front end of the bench.

10. The retractable wall mountable weightlifting bench of claim 1, wherein the support member is tangential to the bench when the bench is in the extended position.

11. The retractable wall mountable weightlifting bench of claim 1, further comprising a connector connected to the support member, wherein when the bench is moved to the retracted position the connector moves the support member into a parallel position where the support member is parallel with the bench.

12. The retractable wall mountable weightlifting bench of claim 11, wherein when the bench is moved to the extended position the connector moves the support member into a tangential position where the support member is tangential with the bench.

13. The retractable wall mountable weightlifting bench of claim 11, wherein the connector includes a first end connected to the support member and a second end opposite of the first end that is connected to the bench.

14. The retractable wall mountable weightlifting bench of claim 11, wherein when the bench is moved to the extended position the connector moves the support member into a tangential position where the support member is tangential with the bench.

15. The retractable wall mountable weightlifting bench of claim 1, wherein the support member is in a parallel position that is parallel to the bench when the bench is in the retracted position, wherein the support member is in a tangential position that is tangential to the bench when the bench is in the retracted position, wherein when the bench is moved from the retracted position to the extended position the support member correspondingly moves from the parallel position to the tangential position correspondingly, and wherein when the bench is moved from the extended position to the retracted position the support member moves from the tangential position to the parallel position correspondingly.

16. The retractable wall mountable weightlifting bench of claim 15, further comprising a connector connected to the support member, wherein when the bench is moved from the retracted position to the extended position the connector moves the support member from the parallel position to the tangential position correspondingly, and wherein when the bench is moved from the extended position to the retracted position the connector moves the support member from the tangential position to the parallel position.

17. The retractable wall mountable weightlifting bench of claim 1, wherein the bench is configured to be in a first position or a second position when the bench is in the extended position, wherein the first position is where the first surface of the bench is horizontal, and wherein the second position is where the first surface of the bench is inclined.

18. A retractable wall mountable weightlifting bench, comprising:
- a mounting bracket adapted to be attached to a wall;
- a bench having a front end, a rear end opposite of the front end, a left side and a right side opposite of the left side, wherein the bench is pivotally connected to the mounting bracket about a horizontal axis, wherein the bench has an elongated structure that has a length, a width and a longitudinal axis, wherein the length is greater than the width of the bench, and wherein the bench includes a first surface;
- wherein the bench has an extended position and a retracted position;
- a first actuator pivotally connected between the bench and the mounting bracket, and wherein the first actuator applies an upward biasing force to the bench to assist in lifting the bench upwardly into the retracted position;
- wherein a longitudinal axis of the bench extends in a direction that is tangential to the wall when the bench is in the extended position;
- wherein the longitudinal axis of the bench extends in a direction that is parallel to the wall when the bench is in the retracted position;
- wherein the first surface of the bench is horizontal when in the extended position;
- wherein the first surface of the bench is adapted to support a torso of an exerciser when in the extended position;
- wherein the bench is positioned near the wall when in the retracted position;
- wherein the front end of the bench is distally positioned away from the wall when the bench is in the extended position;
- wherein the rear end of the bench is closer to the wall than the front end of the bench when the bench is in the extended position;
- wherein the bench is vertically orientated when in the retracted position;
- wherein a distance from the wall to the front end of the bench is less when the bench is in the retracted position than when the bench is in the extended position;
- a support member pivotally attached to the bench about a horizontal axis;
- wherein the support member is connected to the bench near the front end of the bench;
- wherein the support member is not parallel to the first surface of the bench when the bench is in the extended position;
- wherein the support member is parallel to the first surface of the bench when the bench is in the retracted position;
- wherein a lower end of the support member is distally spaced above a floor when in the retracted position;
- wherein the lower end of the support member engages the floor when the bench is in the extended position;
- wherein a lower end of the support member is distally spaced above a floor when in the retracted position; and
- a connector connected to the support member, wherein when the bench is moved to the retracted position the connector moves the support member into a parallel position where the support member is parallel with the bench.

19. The retractable wall mountable weightlifting bench of claim 18, wherein the bench is positioned higher when in the retracted position than when the bench is in the extended position.

20. The retractable wall mountable weightlifting bench of claim 18, wherein the support member is tangential to the bench when the bench is in the extended position.

21. The retractable wall mountable weightlifting bench of claim 18, including a seat connected to the bench near the front end of the bench.

22. The retractable wall mountable weightlifting bench of claim 18, wherein when the bench is moved to the extended position the connector moves the support member into a tangential position where the support member is tangential with the bench.

23. The retractable wall mountable weightlifting bench of claim 18, wherein the connector includes a first end connected to the support member and a second end opposite of the first end that is connected to the bench.

24. A method of using the retractable wall mountable weightlifting bench of claim 18, comprising:
- moving the bench into the extended position;
- performing an exercise on the bench by the exerciser while the bench is in the extended position; and
- moving the bench into the retracted position.

25. A method of using a retractable wall mountable weightlifting bench, the retractable wall mountable weightlifting bench comprising a mounting bracket adapted to be attached to a wall, a bench having a front end, a rear end opposite to the front end, a left side and a right side opposite to the left side, wherein the bench is pivotally connected to the mounting bracket, wherein the bench has an elongated structure that has a length, a width and a longitudinal axis, wherein the length is greater than the width of the bench, and wherein the bench includes a first surface, wherein the bench has an extended position and a retracted position, wherein the first surface of the bench is horizontal or inclined when in the extended position, wherein the first surface of the bench is adapted to support a torso of an exerciser when in the extended position, wherein the bench is positioned near the wall when in the retracted position, wherein the front end of the bench is distally positioned away from the wall when the bench is in the extended position, wherein the rear end of the bench is distally positioned away from the wall when the bench is in the extended position, wherein the rear end of the bench is closer to the wall than the front end of the bench when the bench is in the extended position, wherein the bench is vertically orientated when in the retracted position, wherein a distance from the wall to the front end of the bench is significantly less when the bench is in the retracted position than when the bench is in the extended position, a support member pivotally attached to the bench, wherein the support member is not parallel to the first surface of the bench when the bench is in the extended position, and wherein the support member is parallel to the first surface of the bench when the bench is in the retracted position, the method comprising:
- moving the bench into the extended position;
- performing an exercise with respect to the retractable wall mountable weightlifting bench; and
- moving the bench into the retracted position.

26. The method of claim 25, including a first actuator pivotally connected to the bench, wherein the first actuator is pivotally connected to the wall or the mounting bracket, and wherein the first actuator applies an upward biasing force to the bench to assist in lifting the bench upwardly into the retracted position.

27. The method of claim 25, wherein the bench is positioned higher when in the retracted position than when the bench is in the extended position.

28. The method of claim 25, wherein a lower end of the support member is distally spaced above a floor when in the retracted position, and wherein the lower end of the support member engages the floor when the bench is in the extended position.

29. The method of claim 25, wherein the longitudinal axis of the bench extends in a direction that is tangential to the wall when the bench is in the extended position.

30. The method of claim 29, wherein the longitudinal axis of the bench extends in a direction that is parallel to the wall when the bench is in the retracted position.

* * * * *